US012682791B2

(12) United States Patent
Adams et al.

(10) Patent No.: US 12,682,791 B2
(45) Date of Patent: Jul. 14, 2026

(54) BILLBOARD MOUNT SYSTEM

(71) Applicant: Formetco, LLC, Duluth, GA (US)

(72) Inventors: Jonathon Christopher Adams, Hoschton, GA (US); Robert Lee Franklin, Jr., Snellville, GA (US); Brian David Jeffries, Duluth, GA (US)

(73) Assignee: Formetco, LLC, Duluth, GA (US)

( * ) Notice: Subject to any disclaimer, the term of this patent is extended or adjusted under 35 U.S.C. 154(b) by 4 days.

(21) Appl. No.: 18/631,754

(22) Filed: Apr. 10, 2024

(65) Prior Publication Data

US 2024/0339054 A1 Oct. 10, 2024

Related U.S. Application Data

(60) Provisional application No. 63/459,808, filed on Apr. 17, 2023, provisional application No. 63/458,375, filed on Apr. 10, 2023.

(51) Int. Cl.
*G09F 7/18* (2006.01)

(52) U.S. Cl.
CPC ........ *G09F 7/18* (2013.01); *G09F 2007/1843* (2013.01)

(58) Field of Classification Search
CPC ............... G09F 2007/1891; G09F 7/18; G09F 2007/1843; G09F 15/0012; G09F 15/0018; A47G 1/1606
See application file for complete search history.

(56) References Cited

U.S. PATENT DOCUMENTS 4,712,761 A * 12/1987 Wassell ................ A47G 1/1606 248/475.1
9,609,964 B1 * 4/2017 Munson ................. F16M 13/02
11,399,641 B1 * 8/2022 Garriott ............... A47G 1/1606
2016/0206120 A1 * 7/2016 Kressin .................... A47G 1/02
2018/0119874 A1 5/2018 Kludt et al.
2021/0264825 A1 * 8/2021 Innis ................... G09F 15/0037
2022/0270524 A1 8/2022 Innis
2023/0026421 A1 * 1/2023 Franklin ................. G09F 19/22

FOREIGN PATENT DOCUMENTS

CN 218159495 U 12/2022
KR 10-2016-0137831 A 12/2016

OTHER PUBLICATIONS

International Search Report and the Written Opinion of the International Search Authority for PCT/US2024/023871, mailed Jul. 23, 2024.

* cited by examiner

*Primary Examiner* — Gary C Hoge
(74) *Attorney, Agent, or Firm* — Womble Bond Dickinson LLP

(57) ABSTRACT

A billboard mount system for mounting to a plurality of fixedly positioned stringers of a billboard structure. The billboard mount system having a plurality of panels and each panel is configured to be connected to respective stringers of the billboard structure. Each panel is further connected to an adjoining panel to provide for the formation of the substantially planar billboard display surface, which is positioned in the desired planar orientation.

27 Claims, 26 Drawing Sheets

BILLBOARD MOUNT SYSTEM

CROSS-REFERENCE

The present Patent Application claims benefit of U.S. Provisional Patent Application No. 63/458,375, filed Apr. 10, 2023 and U.S. Provisional Patent Application No. 63/459,808, filed Apr. 17, 2023.

INCORPORATED BY REFERENCE

The disclosures of U.S. Provisional Patent Application No. 63/458,375, filed Apr. 10, 2023 and U.S. Provisional Patent Application No. 63/459,808, filed Apr. 17, 2023 are specifically incorporated by reference herein as if set forth in its entirety.

TECHNICAL FIELD

The present disclosure relates generally to systems, apparatus and methods in the field of outdoor displays or billboards, more particularly, to various aspects involving systems and methods for an improved billboard mounting system that is configurable for mounting to a frame structure of an existing billboard structure.

BACKGROUND

Retrofitting non-digital billboards is typically expensive, time consuming and labor intensive. Moreover, simply removing an older billboard assembly from the billboard's frame structure and replacing it with a new billboard display assembly has not proven entirely satisfactory.

Billboards are structures typically used to display graphics, menus, or other information in outdoor locations. These billboards may be free-standing (e.g., along highways, roads, etc.) or installed on other structures (e.g., on the side of a building, on top of a stadium, on the side of a truck, etc.). During daylight hours, the sign can be visible without any additional lighting structures.

Traditional billboards usually measure 14 feet by 48 feet and contain lighting structures installed on the front of the billboard structure that are directed toward the sign in order to light the sign and improve its visibility, for example, during nighttime hours or bad weather conditions. Over time, the respective stringers of the framed structure of the billboard typically migrate to positions that are not uniform and are not equally spaced from adjacent and/or adjoining stringers. Because of the irregular positioning of the stringers in existing billboard structures, installing a new billboard represents a substantial capital outlay as the replacement of a pre-existing billboard system and the installation of the new billboard system in the proper orientation makes it financially difficult to replace older billboards Therefore, it would be desirable to have an billboard mount system that can be easily and quickly installed on the existing billboard structure, without the need to replace any irregularly oriented stringers, to provide for the formation of a substantially planar billboard display surface that is positioned in a desired planar orientation.

In view of the prior aft, there remains a need for a billboard mount system that can easily and conveniently be attached to existing billboard structures.

SUMMARY

To improve the state of the art, disclosed herein is a billboard mount system, and methods of use thereof, utilizing novel functionalities. The billboard mount system is configured to mount to a plurality of fixedly positioned stringers of a conventional billboard structure. The billboard mount system includes a plurality of panels that mount to the plurality of fixedly positioned stringers of a conventional billboard structure. Each panel is configured to be connected to an adjoining panel to provide for the formation of the substantially planar billboard display surface, which is positioned in the desired planar orientation.

Each panel is configured to mount to respective stringers of the billboard structure and includes a frame assembly and a plurality of first mount assemblies that configured to be coupled to the fixedly positioned stringers of the billboard structure such that a display surface of each of the frame assembly can be positioned in a common display plane that is oriented at a desired angle relative to vertical.

In one aspect, the frame assembly of each panel includes an upper strut and an opposed and parallel lower strut that are connected to respective opposed side struts to form the frame that can be positioned in the display plane. The frame assembly of each panel can also include at least one intermediate strut that is connected to the opposed and parallel side struts to form the frame that positioned in the display plane. In this aspect, the intermediate strut is positioned between and spaced from the upper and opposed lower struts and can be positioned substantially parallel to the respective upper and lower struts.

The plurality of first mount assemblies are configured to be mounted to selected portions of respective stringers of the plurality of fixedly positioned stringers. In one exemplary aspect, each first mount assembly includes a frame mount and a base mount. In this aspect, the frame mount is configured to be fixedly mounted to a selected portion of an underlying frame mount, and the base mount is configured to be fixedly mounted to a selected portion of a side strut.

Still other aspects, embodiments, and advantages of these exemplary aspects and embodiments, are discussed in detail below. Moreover, it is to be understood that both the foregoing information and the following detailed description are merely illustrative examples of various aspects and embodiments and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than can be necessary for a fundamental understanding of the exemplary embodiments discussed herein and the various ways in which they can be practiced. According to common practice, the various features of the drawings discussed below are not necessarily drawn to scale. Dimensions of various features and elements in the drawings can be expanded or reduced to more clearly illustrate the embodiments of the disclosure.

DETAILED DESCRIPTION

Figure 1A:
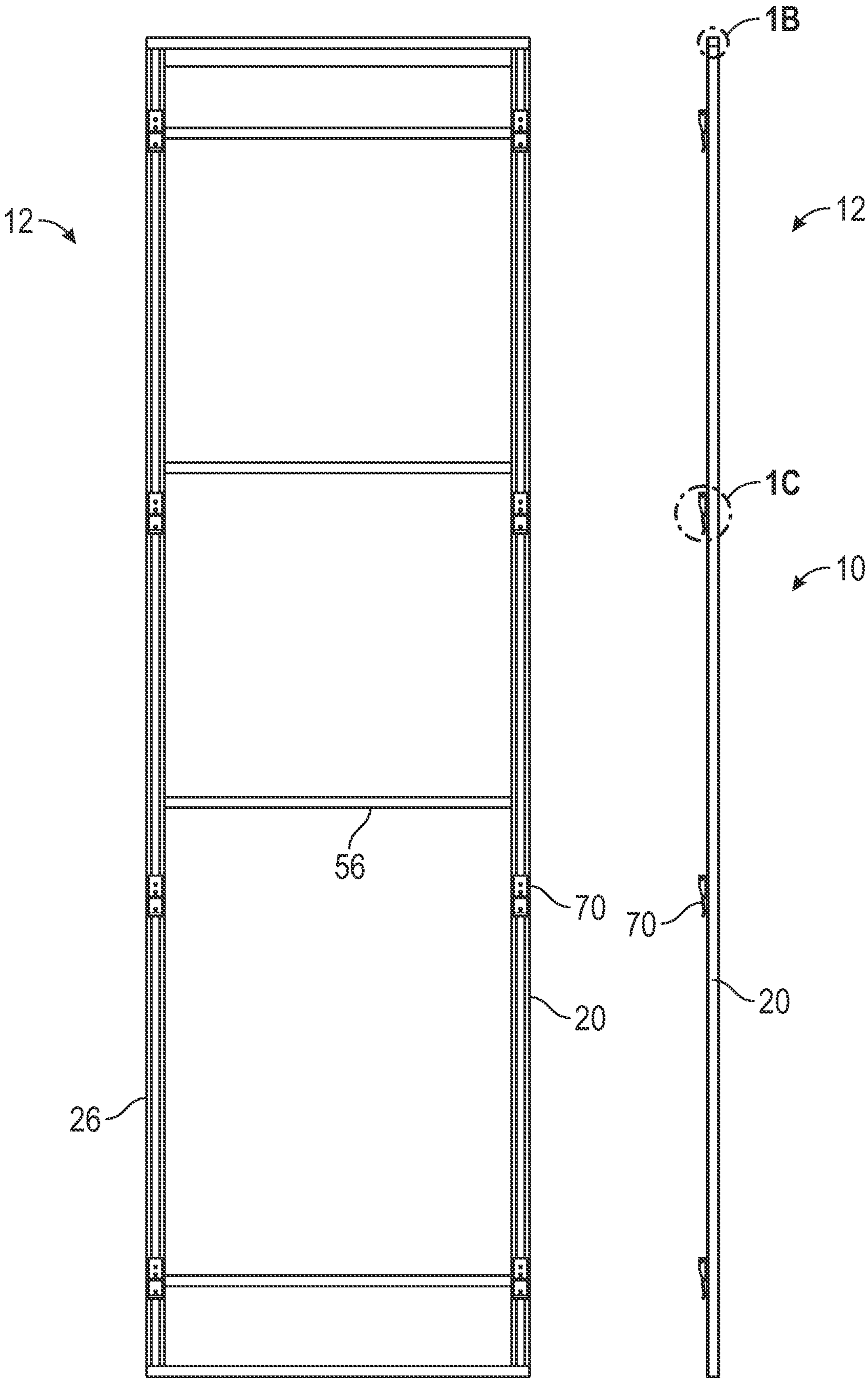
FIG. 1A schematically illustrates an example of a panel of the billboard mount system showing the frame assembly and a plurality of first mount assemblies mounted to side struts of the frame assembly.
Figure 1B:
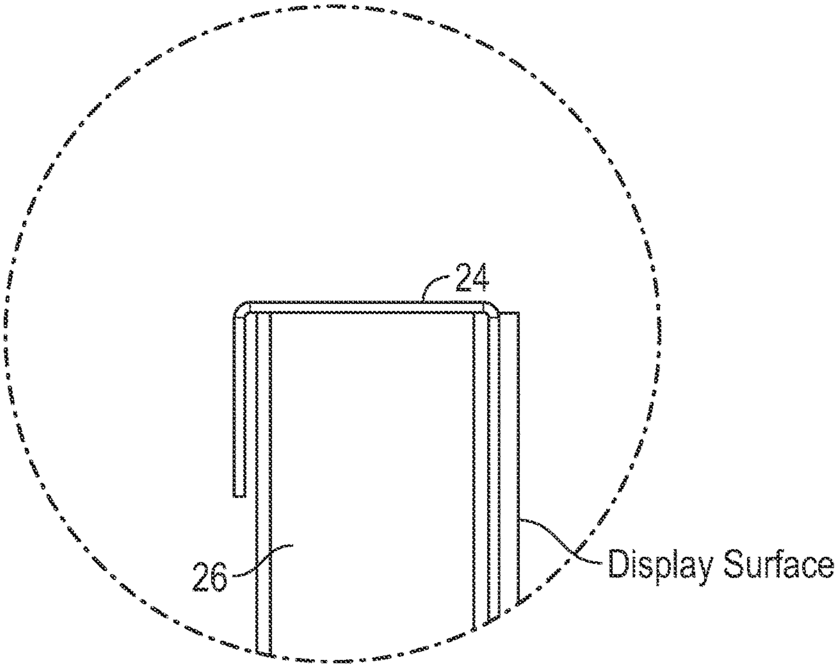
FIG. 1B schematically illustrates an enlarged elevational view of an upper strut mounted to an upper end of a respective side strut.
Figure 1C:
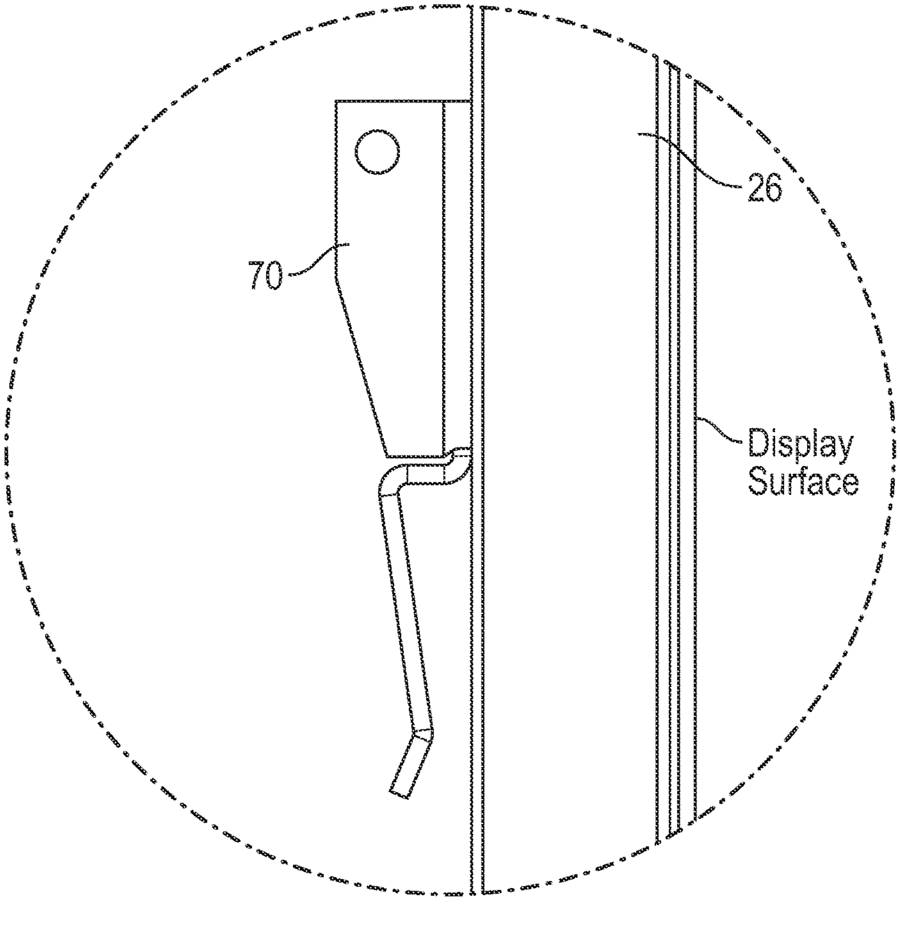
FIG. 1C schematically illustrates an enlarged, partial elevational view of a first mount assembly mounted to a mount surface of a respective side strut.
Figure 2A:
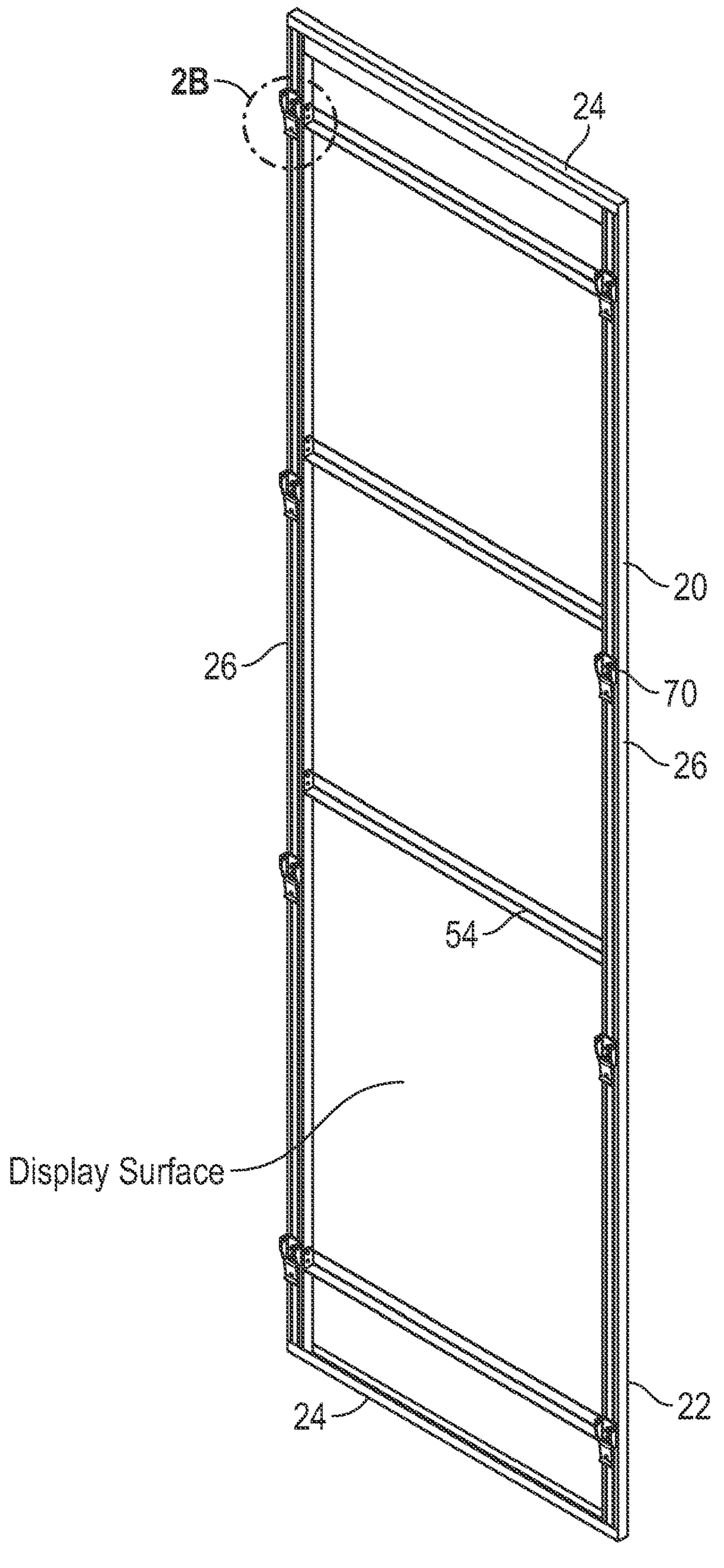
FIG. 2A schematically illustrates a perspective view of a panel of the billboard mount system showing the frame assembly and a plurality of first mount assemblies mounted to side struts of the frame assembly and showing a display surface mounted onto the frame assembly.
Figure 2B:
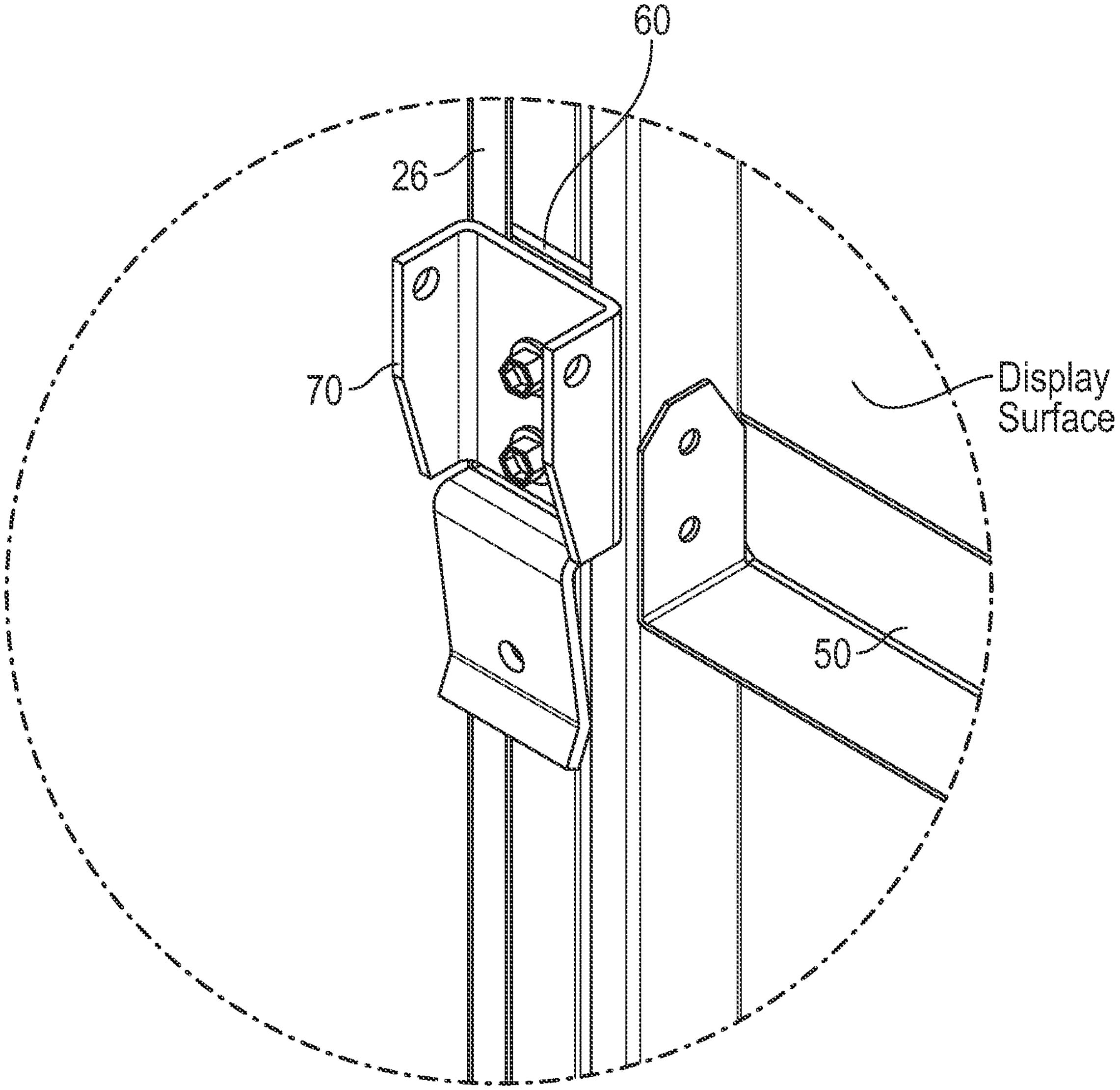
FIG. 2B schematically illustrates an enlarged, partial elevational view of a first mount assembly mounted to a mount surface of a respective side strut and showing an intermediate strut connected to a side strut.
Figure 3A:
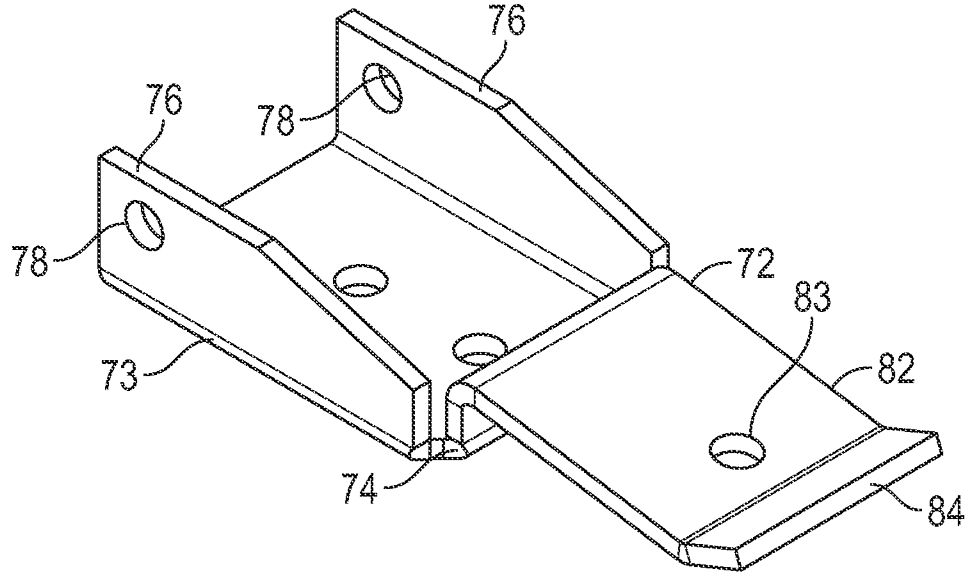
FIG. 3A schematically illustrates a perspective view of a first mount assembly of the panel.
Figure 3B:
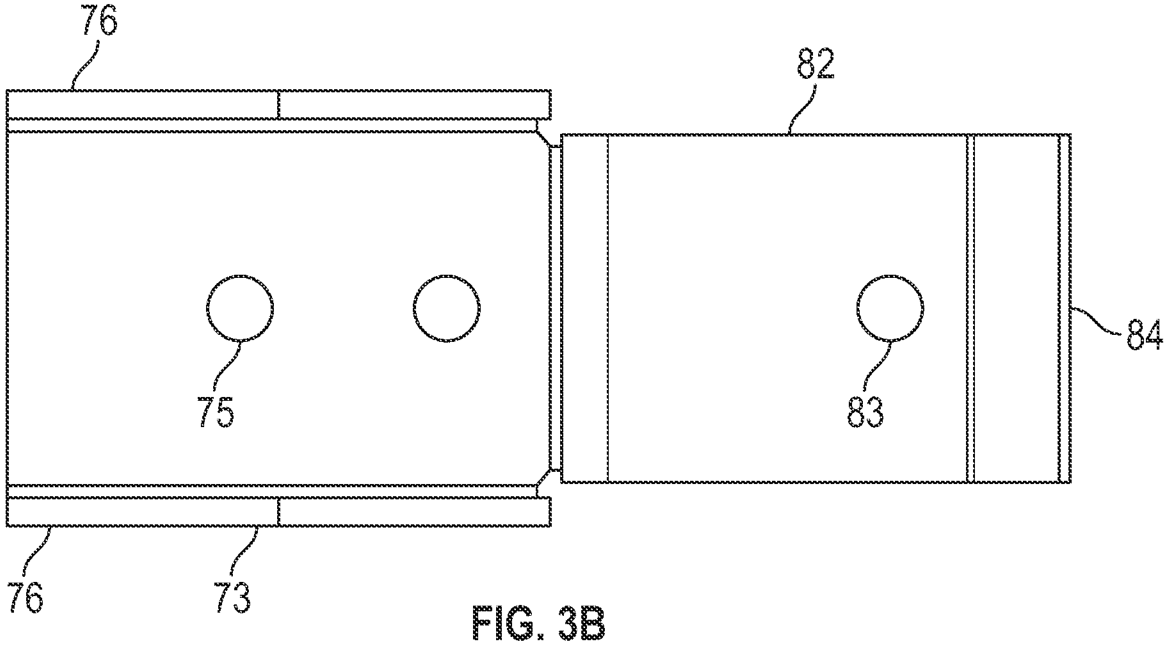
FIG. 3B schematically illustrates a top elevational view of the first mount assembly of FIG. 3A.
Figure 3C:
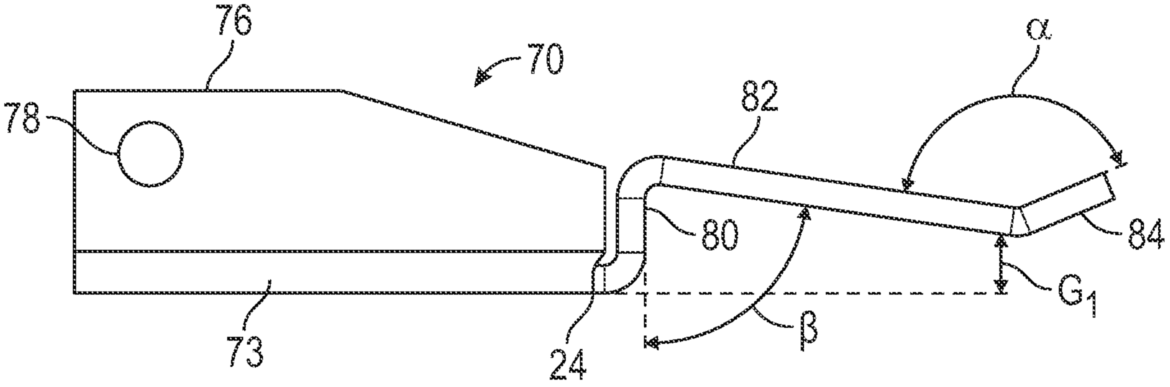
FIG. 3C schematically illustrates a side elevational view of the first mount assembly of FIG. 3A.
Figure 3D:
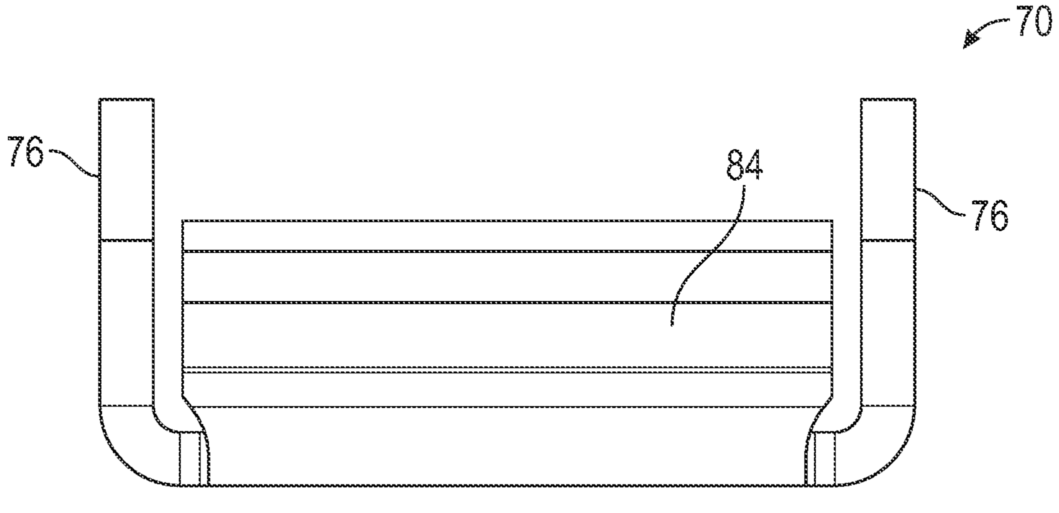
FIG. 3D schematically illustrates an end elevational view of the first mount assembly of FIG. 3A.
Figure 4A:
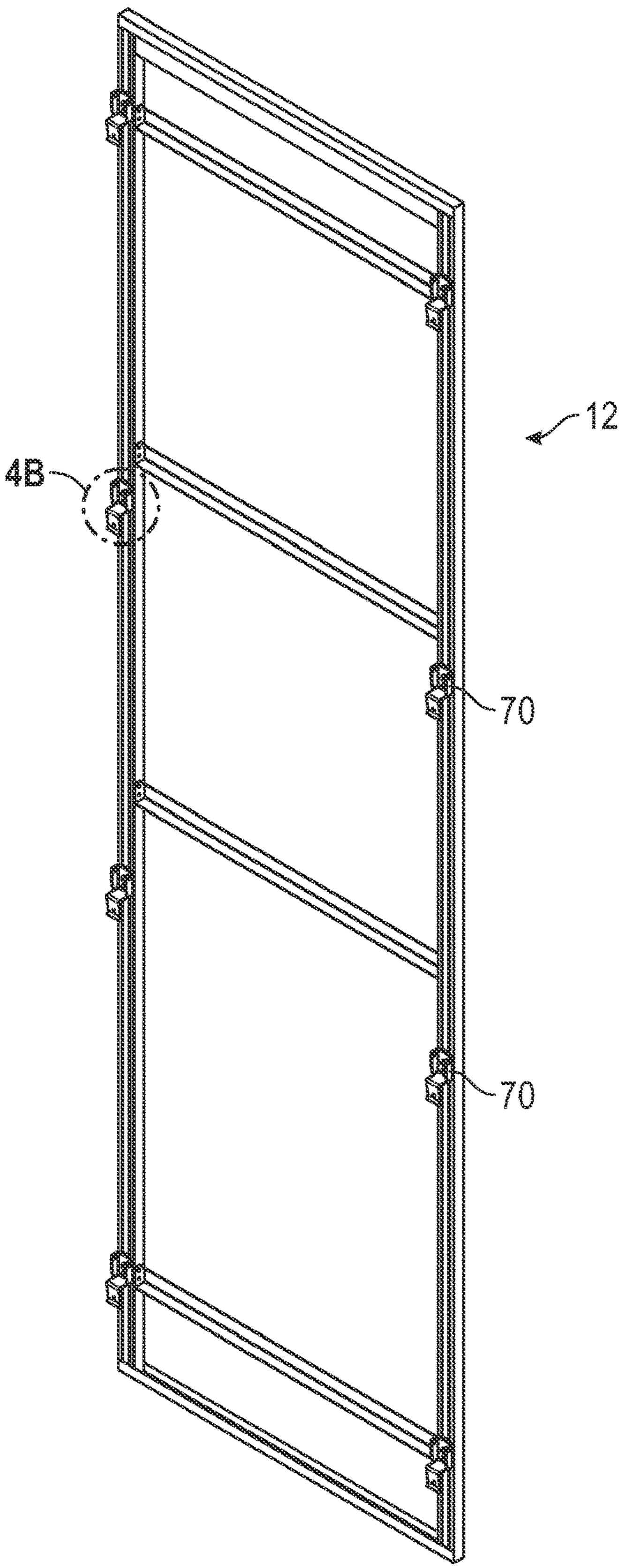
FIG. 4A schematically illustrates a perspective view of a panel of the billboard mount system showing the frame assembly and a second embodiment of the plurality of first mount assemblies of mounted to side struts of the frame assembly and showing a display surface mounted onto the frame assembly.
Figure 4B:
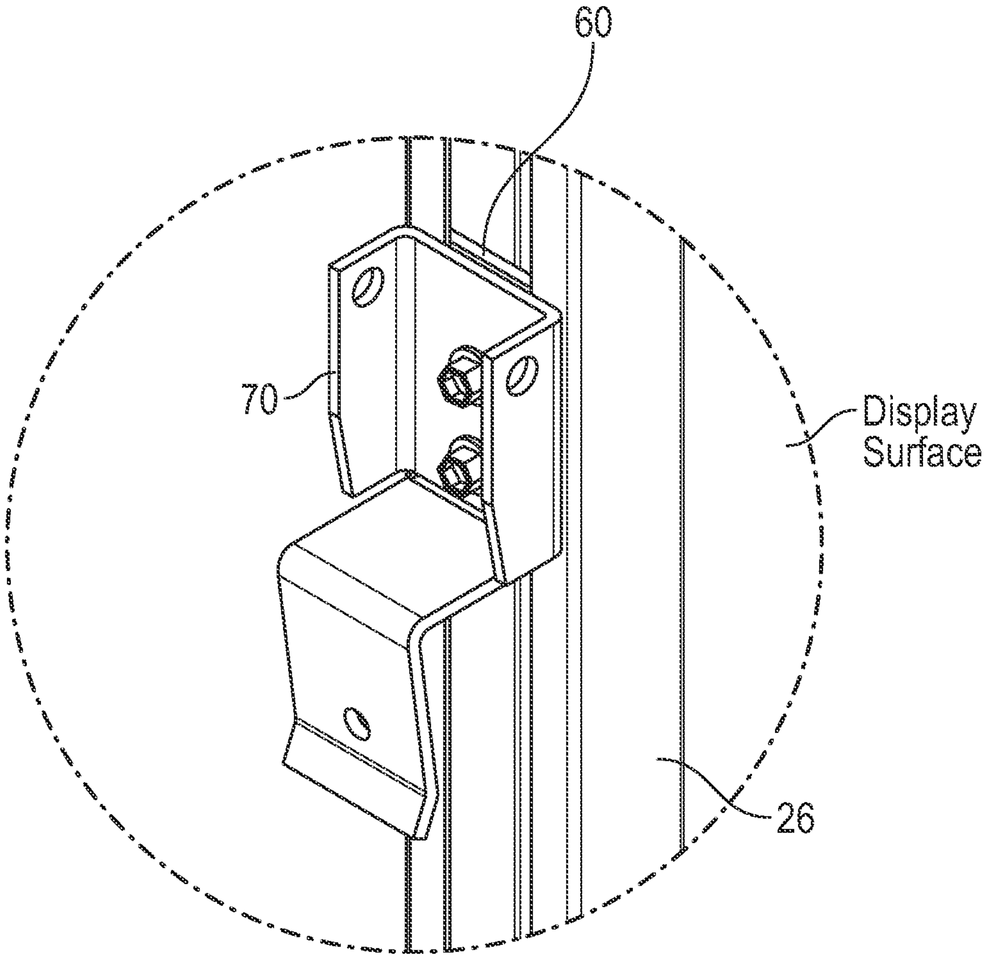
FIG. 4B schematically illustrates an enlarged, partial elevational view of a second embodiment of first mount assembly of mounted to a mount surface of a respective side strut and showing an intermediate strut connected to a side strut.
Figure 4C:
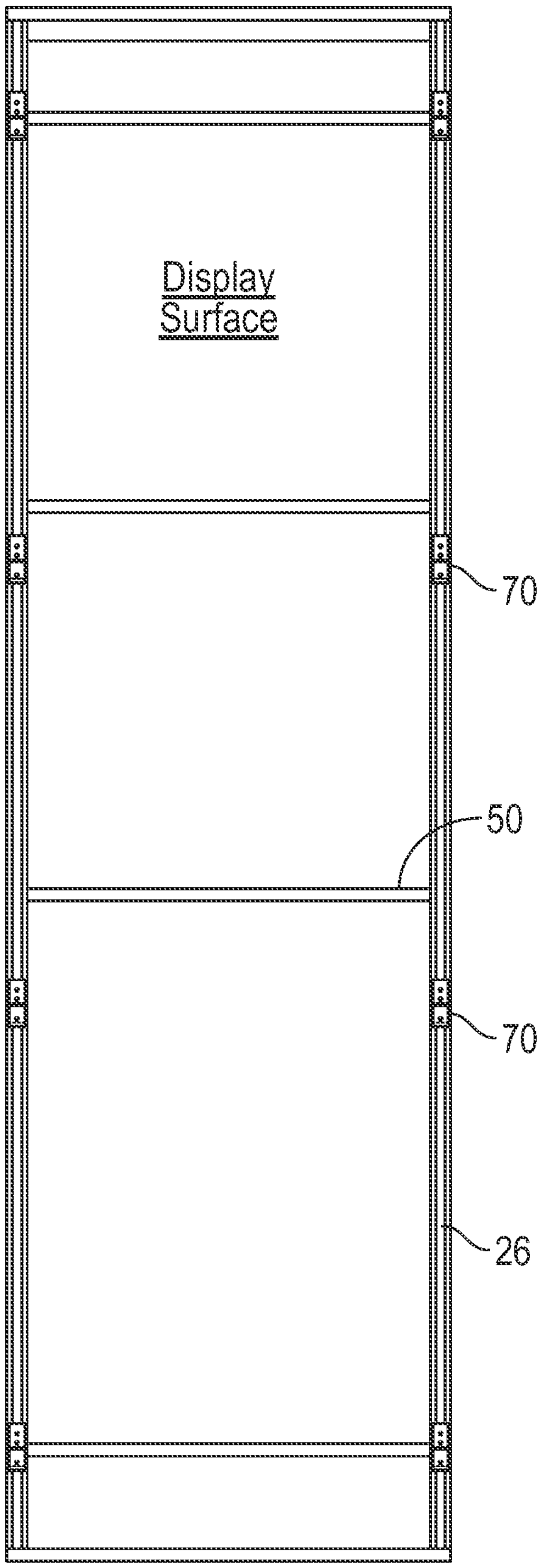
FIG. 4C schematically illustrates an elevational view of a panel of the billboard mount system showing the frame assembly and the plurality of first mount assemblies of FIG. 4A mounted to side struts of the frame assembly and showing a display surface mounted onto the frame assembly.
Figure 4D:
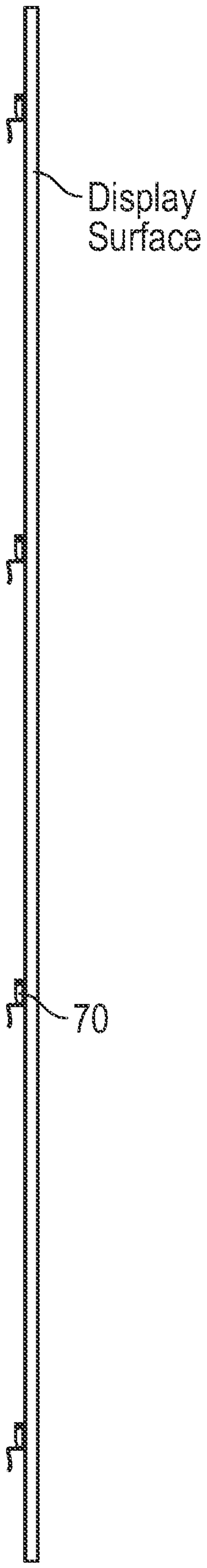
FIG. 4D schematically illustrates an elevational view of a panel of the billboard mount system showing the frame assembly and the plurality of first mount assemblies of FIG. 4A mounted to side struts of the frame assembly and showing a display surface mounted onto the frame assembly.
Figure 4E:
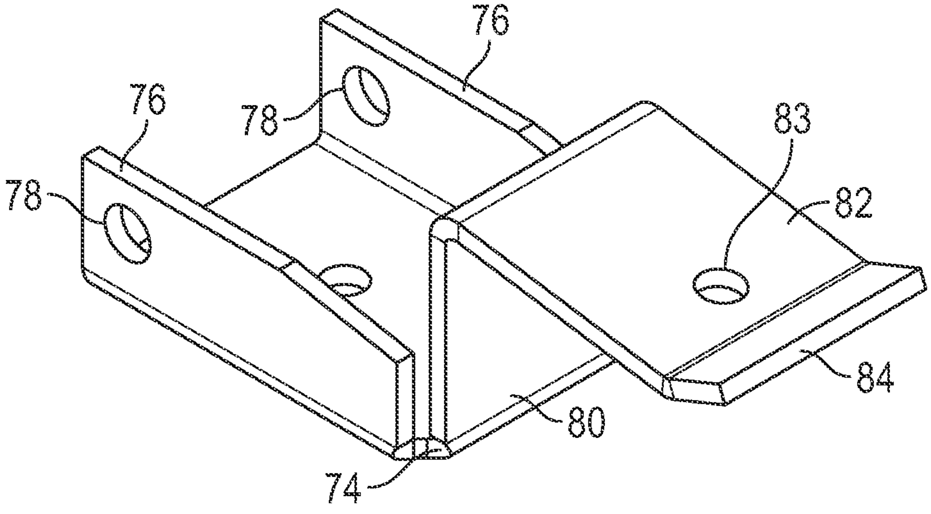
FIG. 4E schematically illustrates a perspective view of the second embodiment of the first mount assembly of the panel.
Figure 4F:
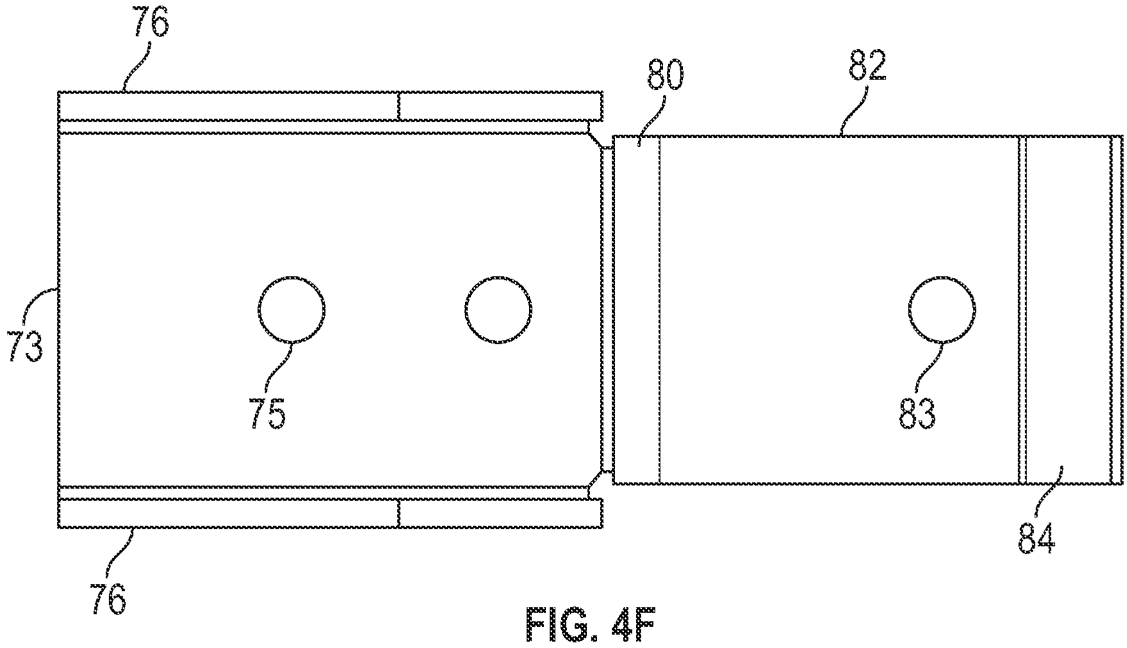
FIG. 4F schematically illustrates a top elevational view of the second embodiment of the first mount assembly of the panel.
Figure 4G:
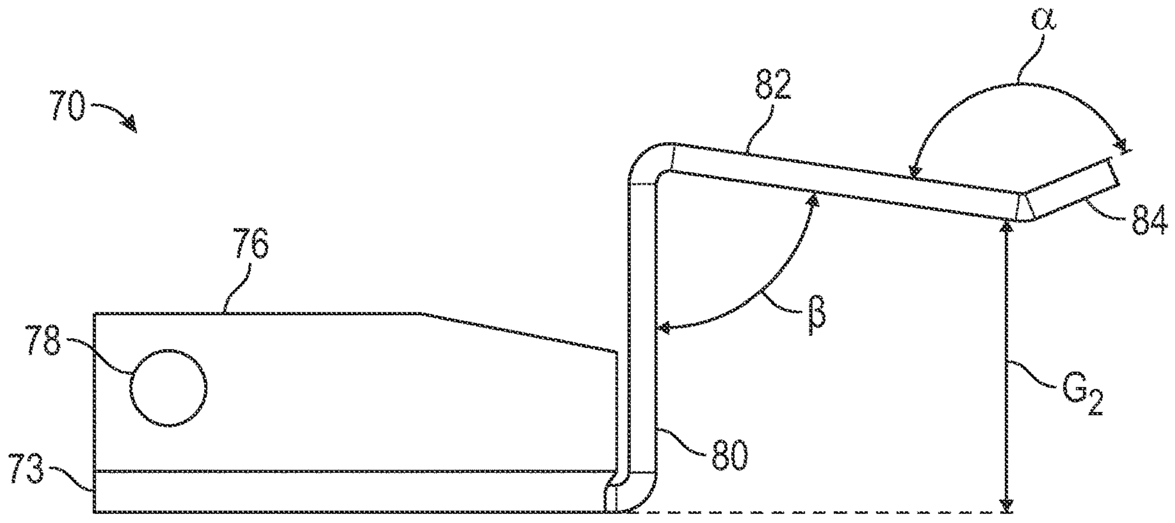
FIG. 4G schematically illustrates a side elevational view of the second embodiment of the first mount assembly of the panel.
Figure 4H:
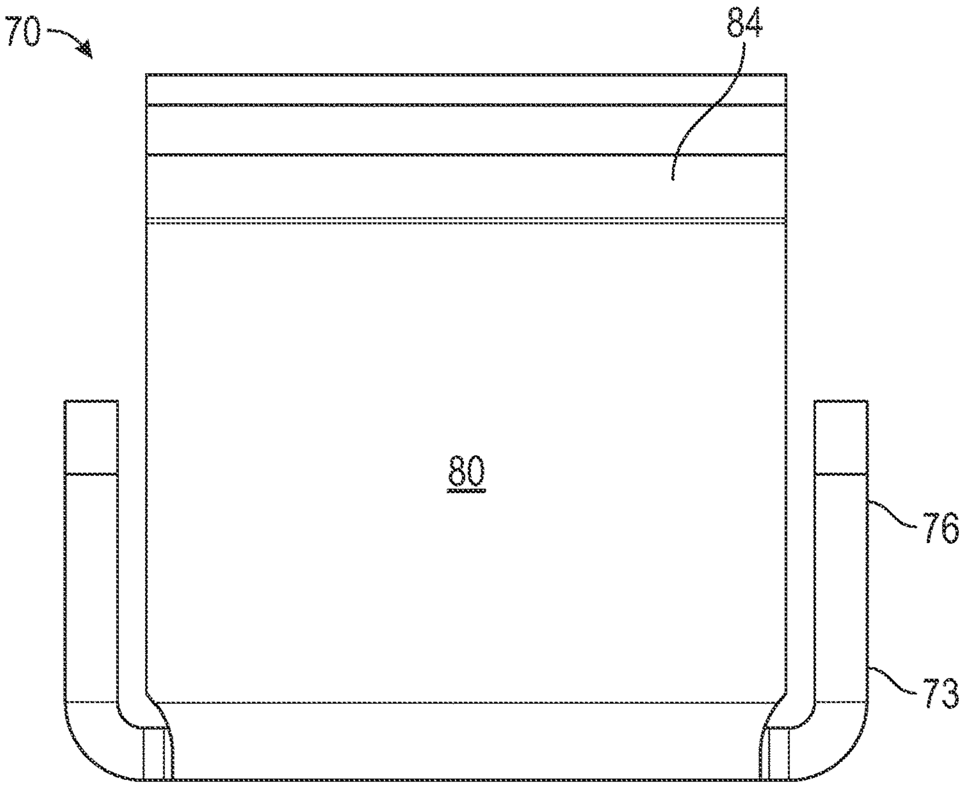
FIG. 4H schematically illustrates an end elevational view of the second embodiment of the first mount assembly of the panel.
Figure 5A:
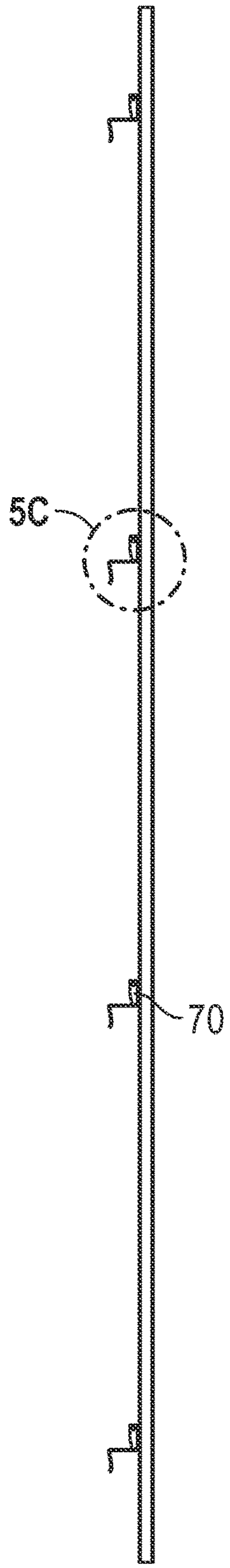
FIG. 5A schematically illustrates a side elevational view of a panel of the billboard mount system showing the frame assembly and a third embodiment of the plurality of first mount assemblies mounted to side struts of the frame assembly and showing a display surface mounted onto the frame assembly.
Figure 5B:
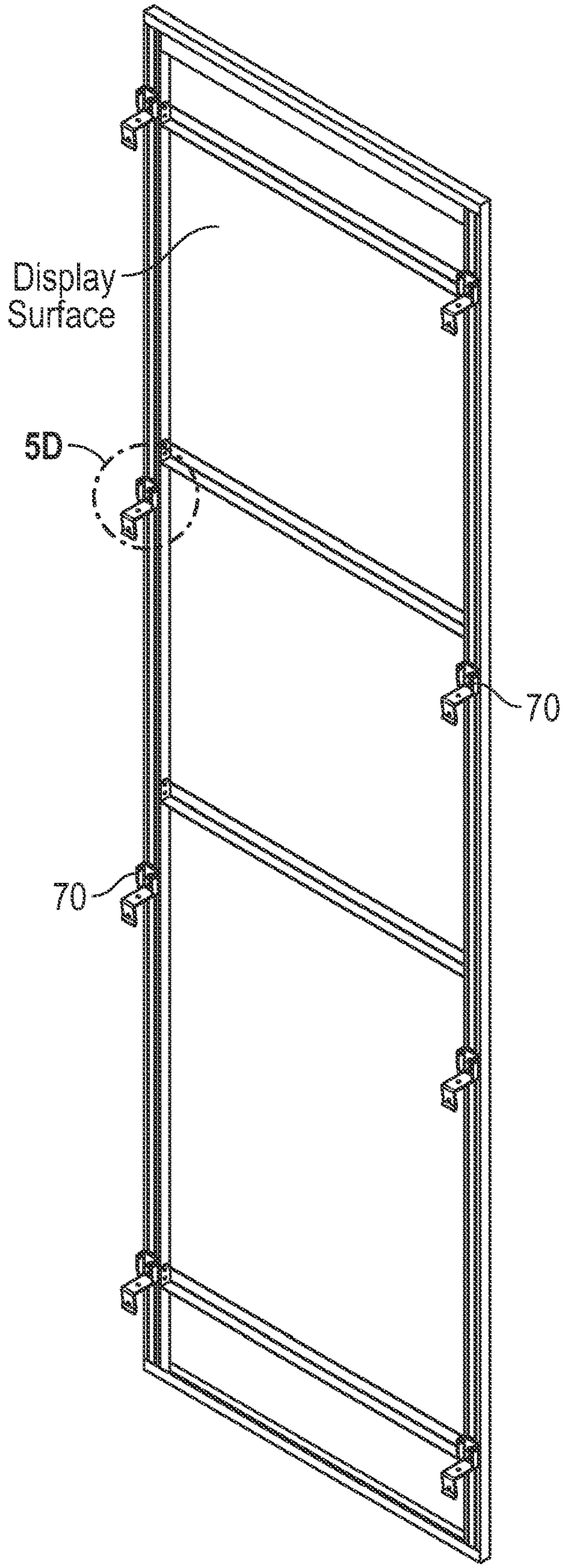
FIG. 5B schematically illustrates a perspective view of a panel of the billboard mount system showing the frame assembly and a third embodiment of the plurality of first mount assemblies of mounted to side struts of the frame assembly and showing a display surface mounted onto the frame assembly.
Figure 5C:
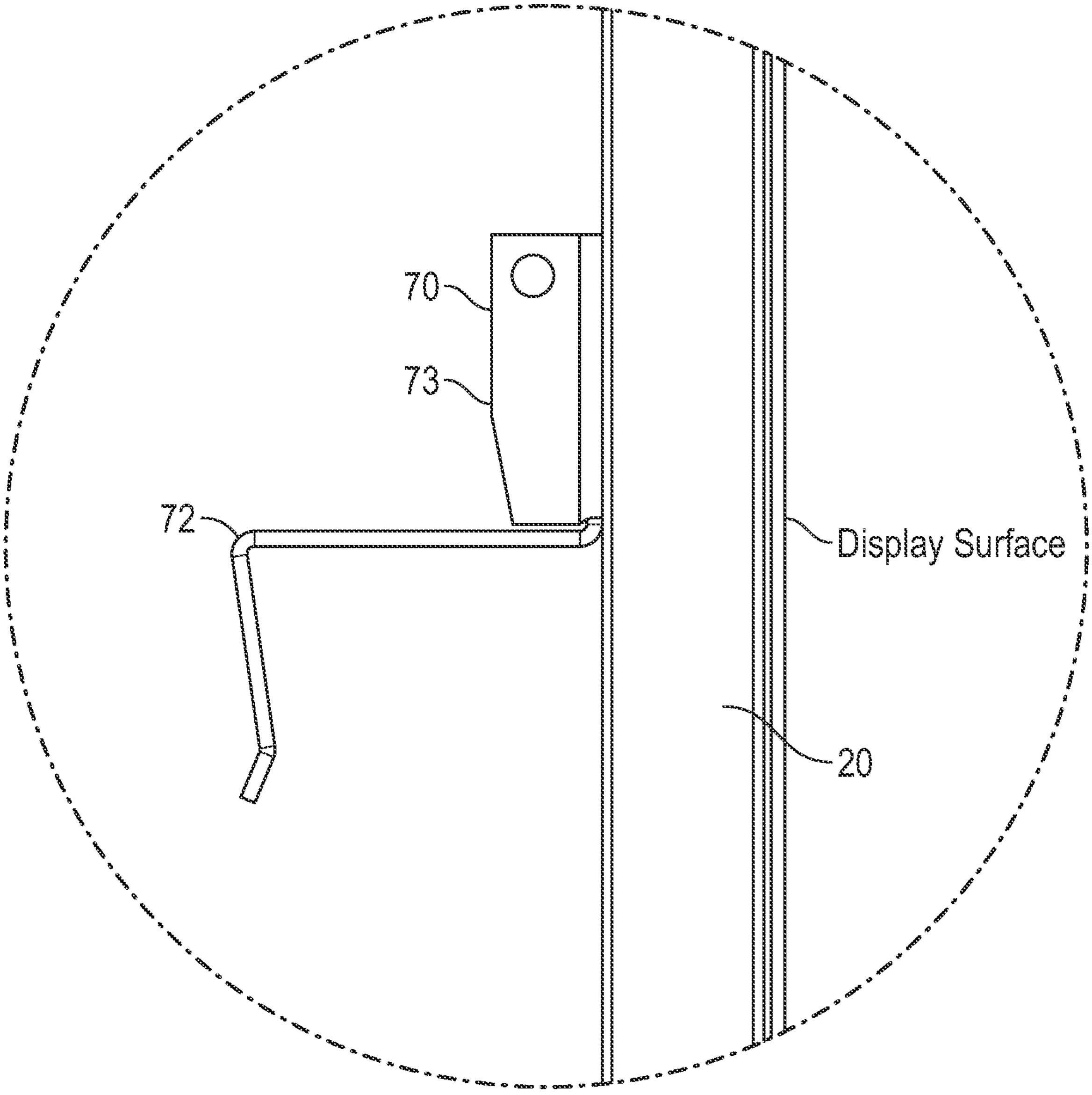
FIG. 5C schematically illustrates an enlarged, partial elevational view of a third embodiment of first mount assembly of mounted to a mount surface of a respective side strut and showing an intermediate strut connected to a side strut.
Figure 5D:
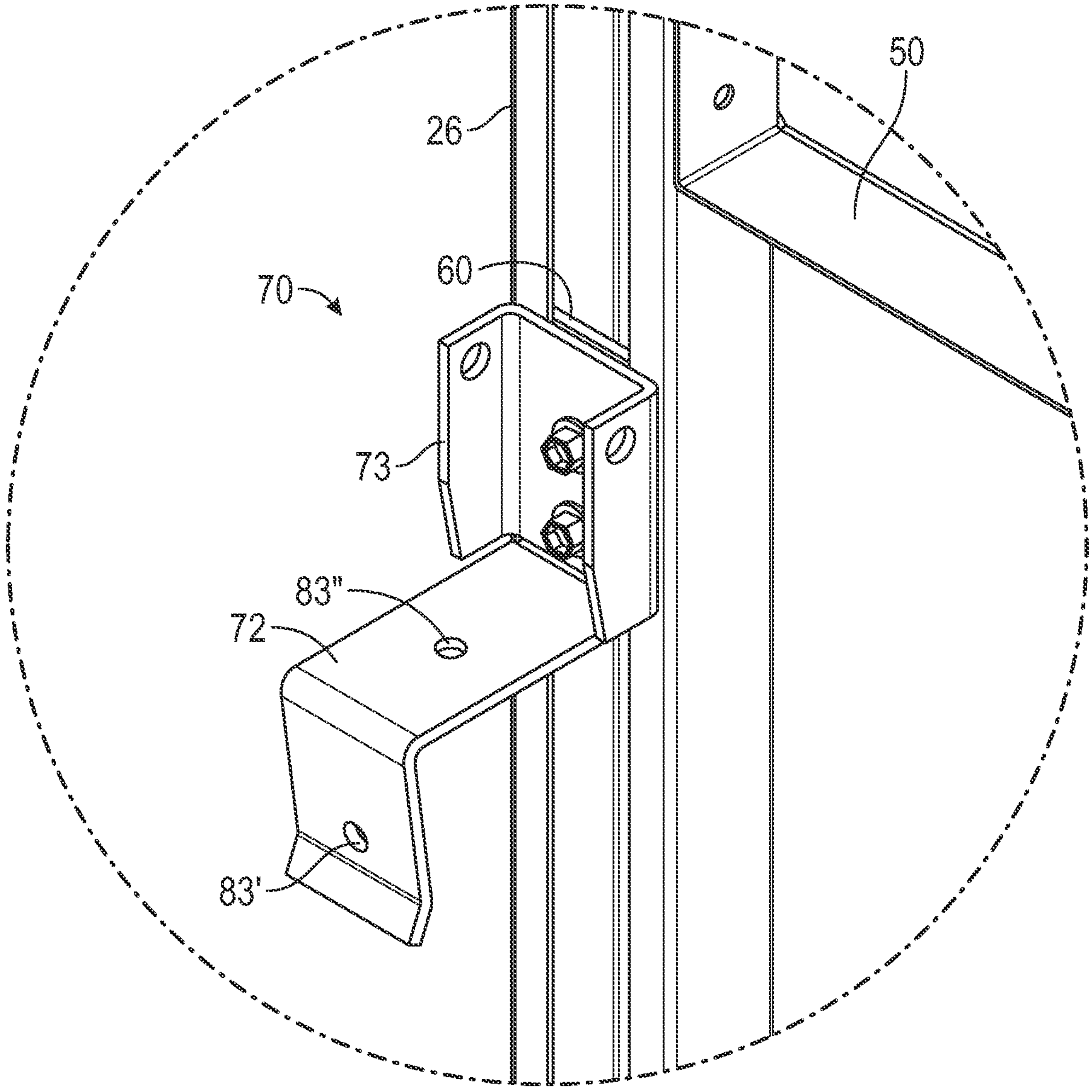
FIG. 5D schematically illustrates an enlarged, partial perspective view of a third embodiment of first mount assembly of mounted to a mount surface of a respective side strut and showing an intermediate strut connected to a side strut.
Figure 5E:
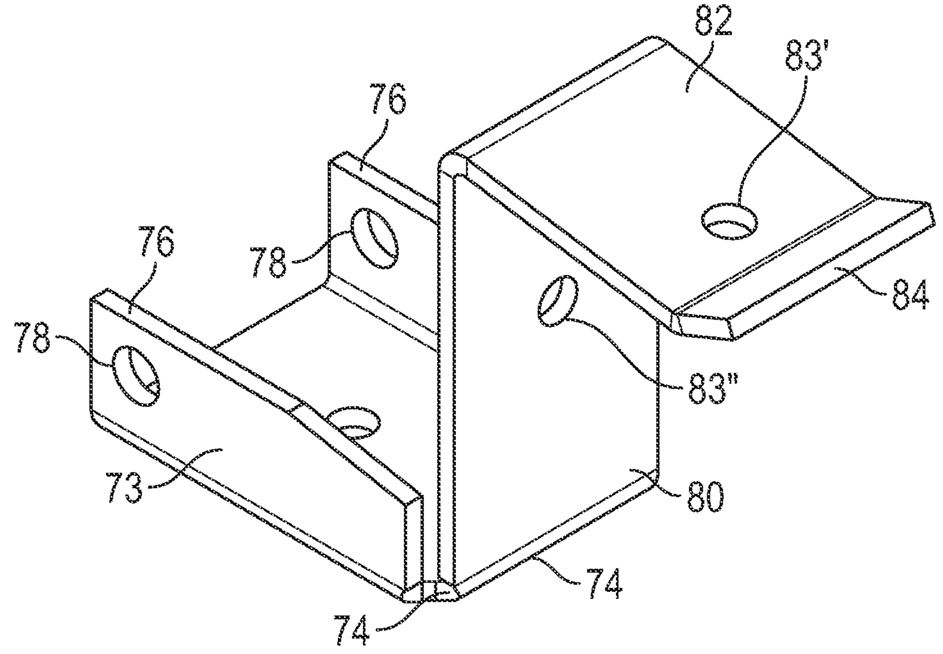
FIG. 5E schematically illustrates a perspective view of the third embodiment of the first mount assembly of the panel.
Figure 5F:
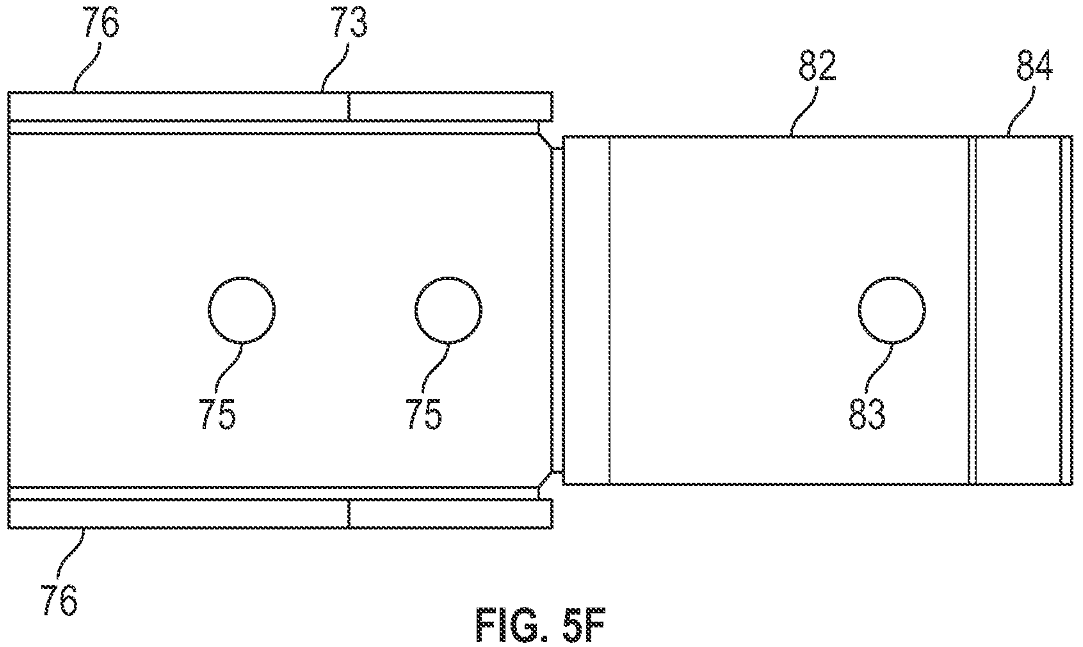
FIG. 5F schematically illustrates a top elevational view of the third embodiment of the first mount assembly of the panel.
Figure 5G:
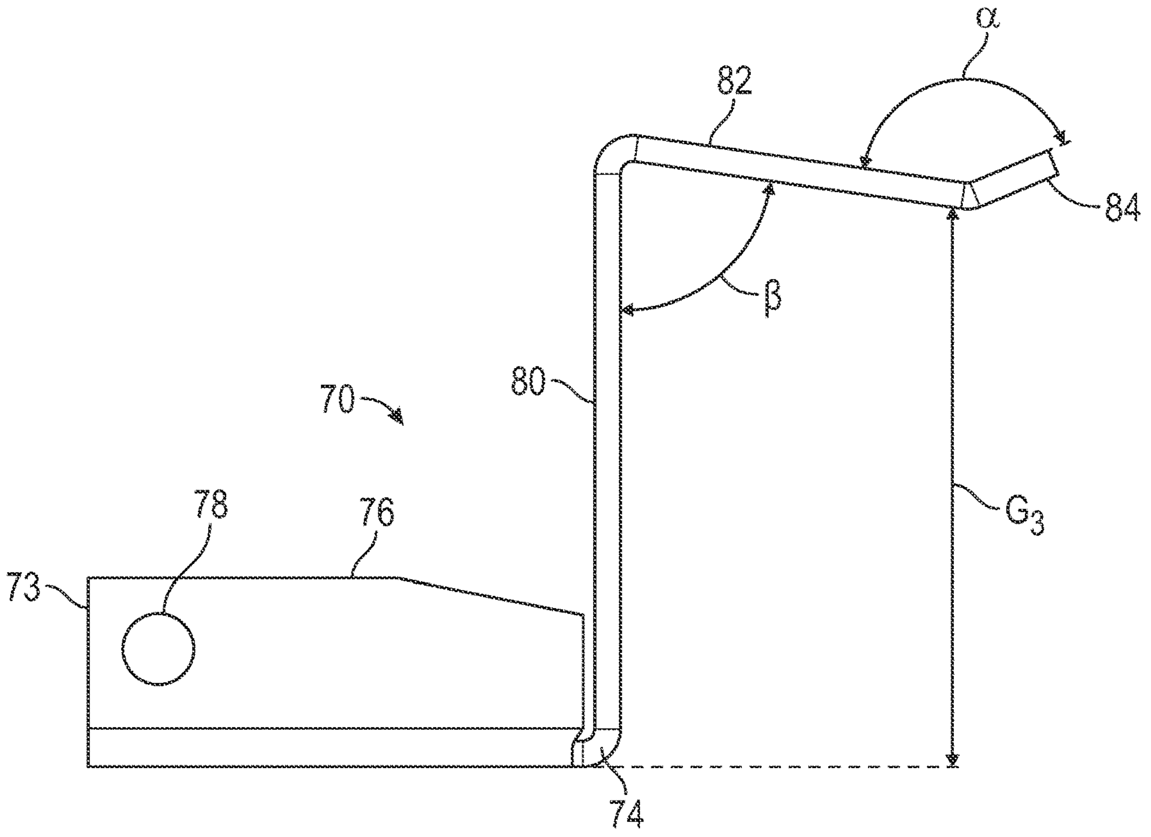
FIG. 5G schematically illustrates a side elevational view of the third embodiment of the first mount assembly of the panel.
Figure 5H:
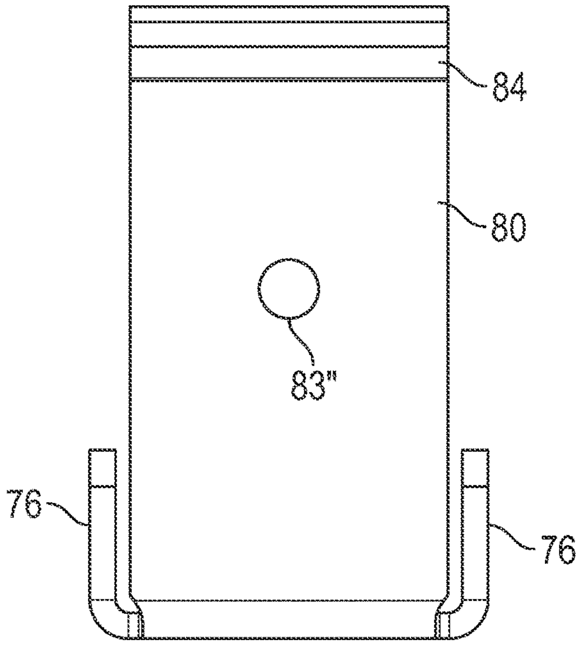
FIG. 5H schematically illustrates an end elevational view of the third embodiment of the first mount assembly of the panel.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a mount assembly" can include two or more such mount assemblies unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

Referring to the figures, disclosed herein is a billboard mount system 10, and methods of use thereof, that is configured to mount to a plurality of fixedly positioned stringers of an existing billboard structure. One skilled in the art will appreciate that the substantially horizontal stringers of an existing billboard structure that remain when an existing display surface is removed from a billboard structure are typically not oriented horizontally relative to the underlying ground surface but have, overtime, migrated to other positions that are angled relative to the underlying horizontal ground surface. Thus, it is common for each stringer of the existing billboard structure to vary in horizontal orientation and to vary in relative orientation to other stringers in the grouping of horizontal stringer of the billboard structure.

As illustrated, the billboard mount system 10 includes a plurality of panels 12 that mount to the plurality of fixedly positioned stringers 4 of a conventional billboard structure 5. In one aspect, each panel is configured to be connected to an adjoining panel to provide for the formation of the substantially planar billboard display surface, which is positioned in a desired planar orientation. In one aspect, each panel includes a frame assembly 20 and a plurality of first mount assemblies 70. In operation, the plurality of panels are configured to be coupled to the of plurality of stringers the billboard structure such that formed billboard display can be positioned in a display plane Dp that is oriented at a desired angle relative to the horizontal.

In one aspect, and referring to FIGS. 7A-8B, the frame assembly 20 of each panel 12 includes an upper strut 24 and an opposed and parallel lower strut 24 that are connected to respective opposed and parallel side struts 26 to form the panel frame 22 that can be positioned in the display plane. In an exemplary aspect, each strut of the frame assembly can be formed from a conventional strut channel, which can be formed of metal such as galvanized steel.

As shown, each upper and lower strut 24 can include a top strut portion 30 having longitudinally extending edges and first and second strut legs 32 that are connected to the longitudinally extending edges of the top strut portion and are positioned in parallel planes that are transverse to the top strut portion. As further shown, it is contemplated that the respective inner surface of the top strut and the first and second strut legs define a longitudinally extending channel 38 having a first width dimension (d1) in cross-section that is greater than the depth dimension of the side strut 40.

In one aspect, each side strut 26 includes a lower strut portion 40 having longitudinally extending edges and first and second strut legs 42 that are connected to the longitudinally extending edges of the lower strut portion 40 and are positioned in parallel planes that are transverse to the top strut portion. Each side strut 26 can further include first and second strut flanges 44 that are connected to respective longitudinally extending edges of the respective first and second strut legs 42. In this aspect, each strut flange 44 defines a first mount surface 46 suitable for engagement of a bottom surface of a base mount of a first mount assembly and an opposed, second mount surface 45 suitable for engagement of a back member 60.

As further shown, it is contemplated that the respective inner surface of the lower strut portion 40 and the first and second strut legs 42 define a longitudinally extending channel 48 having a second width dimension (d2) in cross-section that is less than the width of the back member. Further, it is contemplated that a third width dimension (d3) between the opposing inwardly projecting first and second strut flanges 44 is greater than the width of the back member.

Figure 6A:
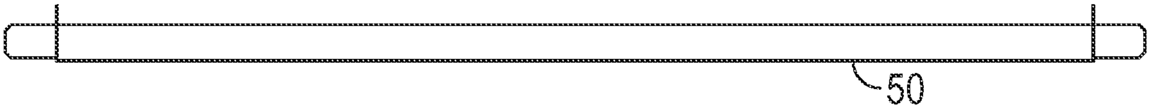
FIG. 6A schematically illustrates a top elevational view of an intermediate strut of the frame assembly.
Figure 6B:
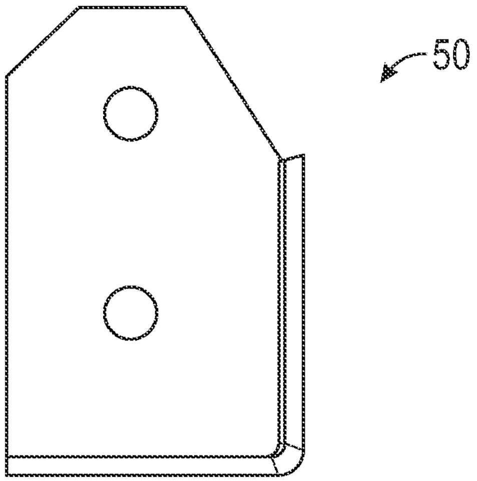
FIG. 6B schematically illustrates an end elevational view of the intermediate strut of FIG. 6A.
Figure 6C:
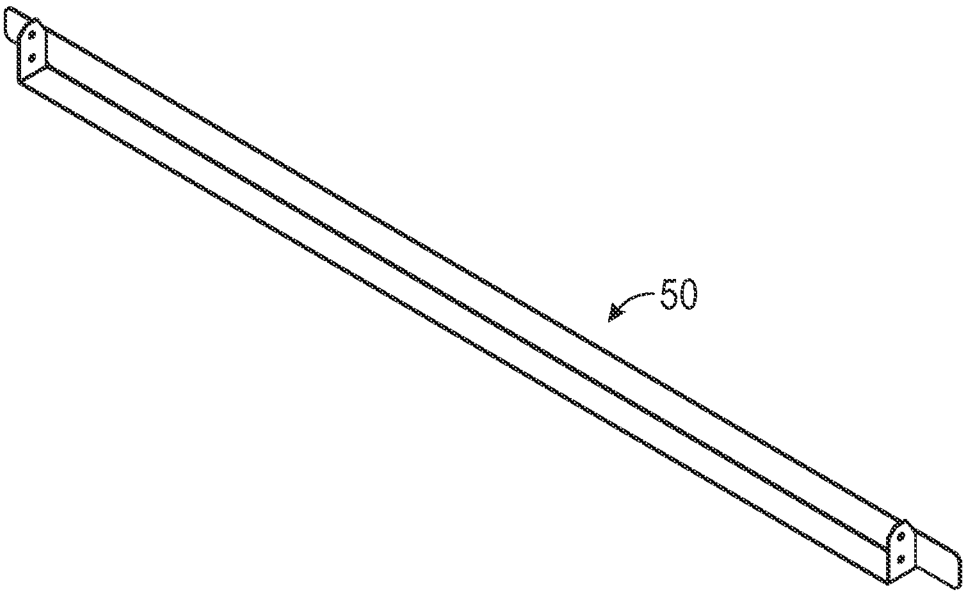
FIG. 6C schematically illustrates a perspective view of the intermediate strut of FIG. 6A.
Figure 7A:
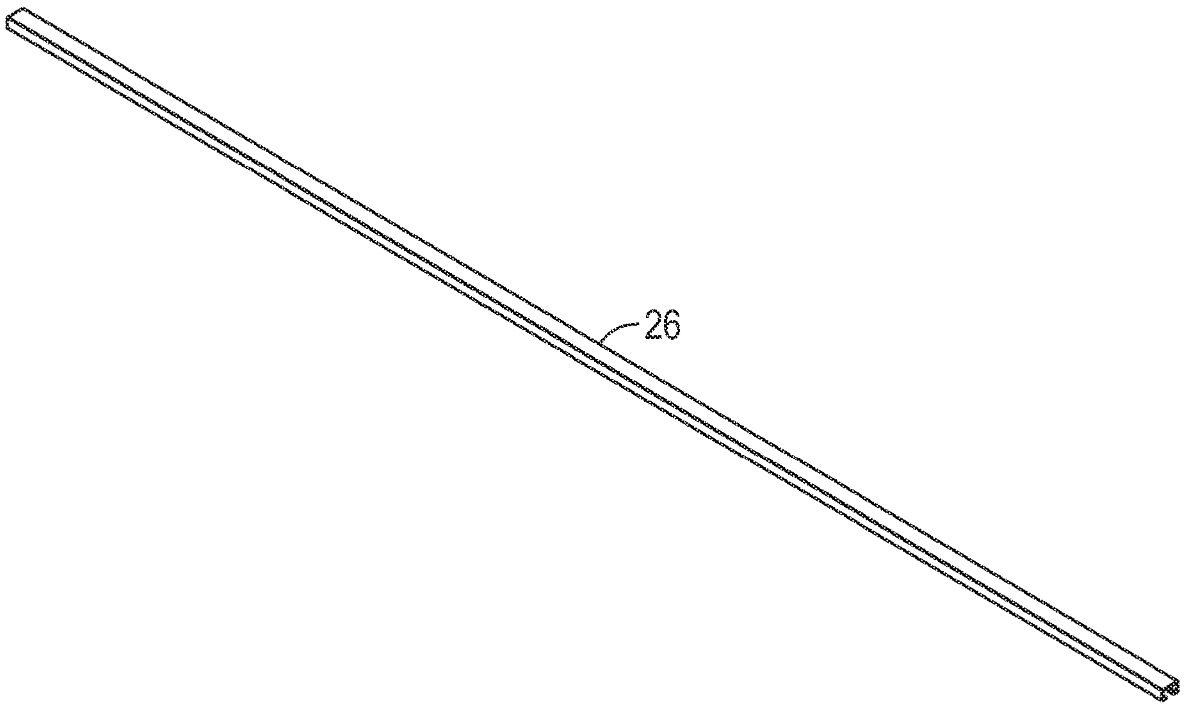
FIG. 7A schematically illustrates a perspective view of a side strut of the frame assembly.
Figure 7B:
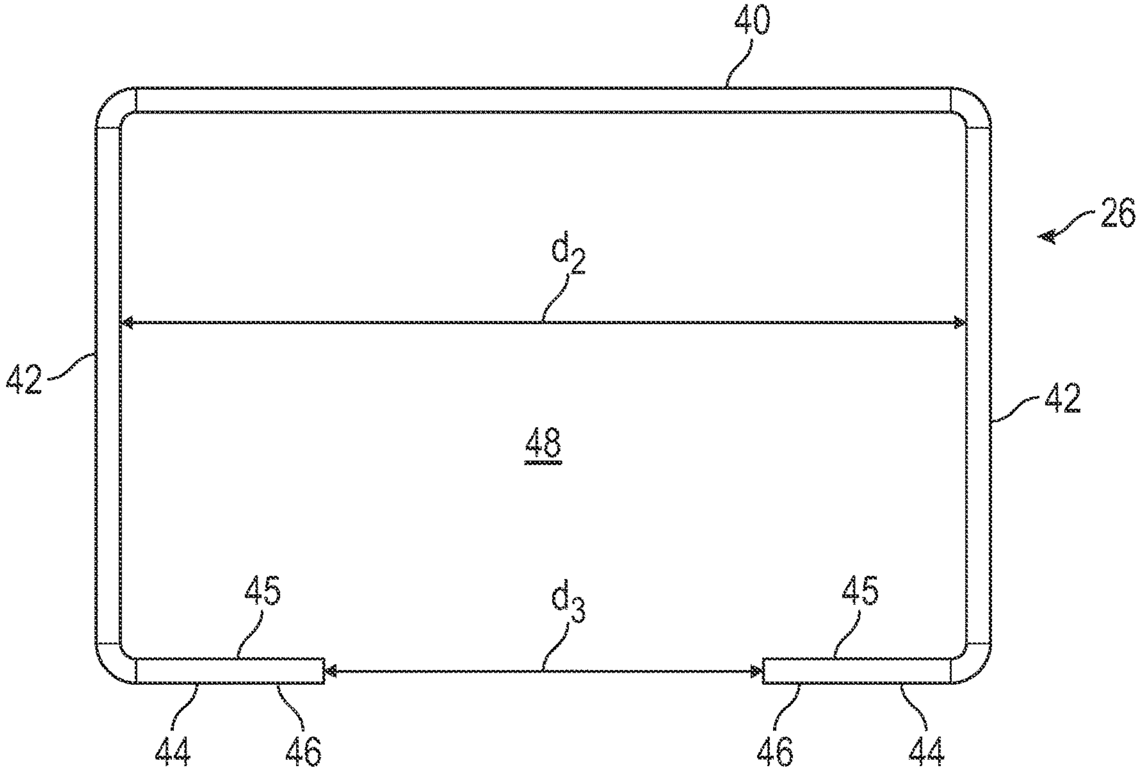
FIG. 7B schematically illustrates an end elevational view of the side strut of FIG. 7A.
Figure 8A:
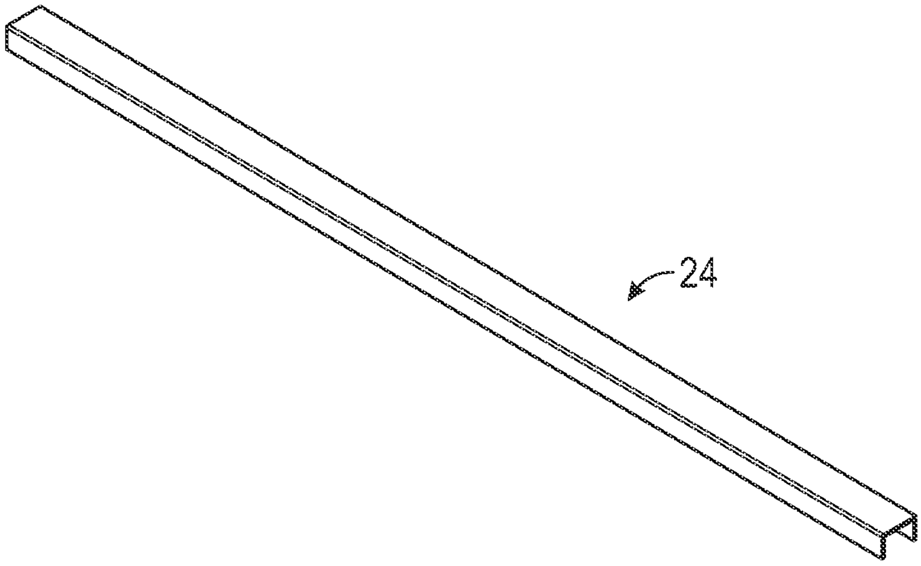
FIG. 8A schematically illustrates a perspective view of an upper and lower strut of the frame assembly.
Figure 8B:
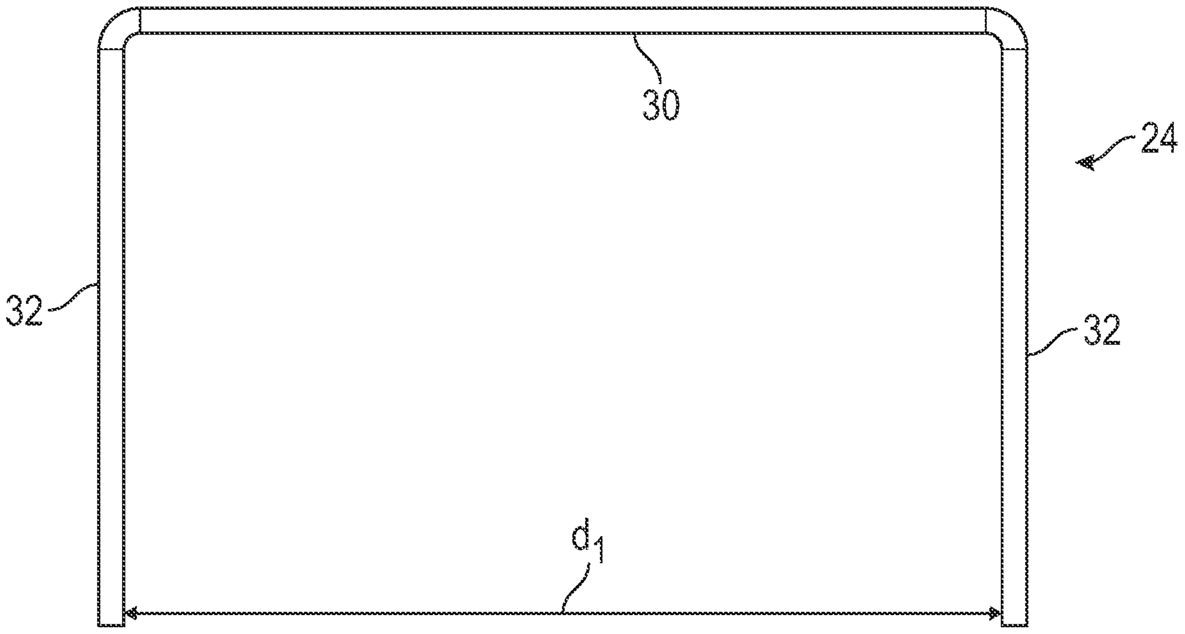
FIG. 8B schematically illustrates an end elevational view of the upper and lower strut of FIG. 8A.

As shown in FIGS. 6*a*-6C, the frame assembly 10 of each panel 12 can also include at least one intermediate strut 50 that is connected to the opposed and parallel side struts to form the frame that positioned in the display plane. In this aspect, the intermediate strut can be positioned between and spaced from the upper and opposed lower struts and can be positioned substantially parallel to the respective upper and lower struts.

Referring to FIGS. 2A to 6C, the plurality of first mount assemblies 70 are configured to be mounted to selected portions of respective stringers 4 of the plurality of fixedly positioned stringers. In one exemplary aspect, each first mount assembly 70 includes a frame mount 72 and a base mount 73. In this aspect, the first mount assembly 72 is configured to be fixedly mounted to a selected portion of an underlying stringer 4, and the base mount 73 is configured to be fixedly mounted to a selected portion of a side strut of a panel.

Figure 9:
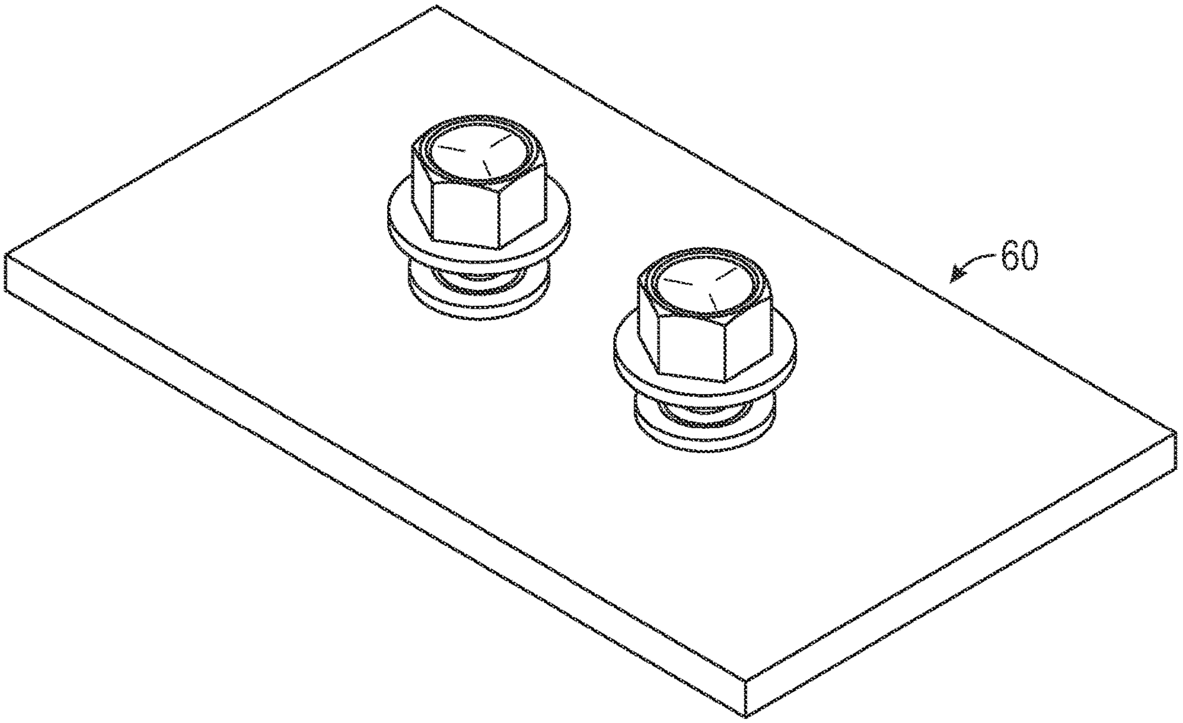
FIG. 9 schematically illustrates a perspective view of a back member that is configured to be selectively coupled to a base mount of a first mount assembly such that respective portions of a side strut are fixedly positioned between portions of the back member and portions of the base mount.

As shown, the base mount 73 of each first mount assembly is substantially planar and has a distal edge 74 and a pair of opposing side edges. In one aspect, the base mount 73 defines at least one opening 75 extending therethrough the base mount that is sized and configured to receive a fastener, such as, for example a conventional bolt/nut combination as shown in FIG. 9.

In one aspect the base mount can include first and second legs 76 that are connected to the side edges of the base mount and are positioned in parallel planes that are transverse to the base mount. The respective first and second legs 76 define openings 78 that extend through the width of the respective legs along a co-axial axis. In operation, when two panels are positioned in adjoining relationship, respective base mounts of the adjoining panels are positioned in opposition such that openings in the opposing base mounts of the adjoining first mount assemblies are positioned in coaxial relationship. This allows for a fastener, such an appropriately sized bolt/nut combination, to be inserted into the opening such that the opposed first mount assemblies can be fixed relative to each other. As one will appreciate, this action for each of the opposed first mount assemblies will allow for adjoining panel members to be fixed relative to each other.

The frame mount 72 has a first leg 80 that is connected to the distal edge of the base mount and is positioned in a plane transverse to the base mount. A second leg 82 is connected to a distal end of the first leg 80 and extends downwardly and away to a third leg 84 (toward a plane in which the base mount is positioned). The second leg is positioned at an acute angle β with respect to the first leg. In one aspect, the acute angle β can be between 70 to 87 degrees; preferably between about 75 to 85 degrees; more preferably between about 80 to 84 degrees; and still more preferred about 82 degrees.

The third leg 84 of the frame mount is connected to a distal end of the second leg 82 and extends outwardly and away from the plane in which the base mount is positioned. In this aspect, the third leg is positioned at an obtuse angle α with respect to the second leg. In one exemplary aspect, and not meant to be limiting, the obtuse angle α can be between 130 to 170 degrees; preferably between about 140 to 160 degrees; more preferably between about 145 to 155 degrees; and still more preferred about 150 degrees.

One skilled in the art will appreciate that the distance between the juncture of the second leg and the first leg and the plane in which the base mount is positioned forms a gap G that is sized to enable a stringer of the billboard structure to be received and guided into contact with the first leg of the frame mount.

As shown in FIGS. 3A-3D, 4B-4H, 5C-5H, the gap G can be sized, for example and without limitation, to accept: a conventional ⅜" metal angle iron stringer (as shown as $G_1$ in the first embodiment of the first mount assembly, FIGS. 3A-3D); a conventional 2×6 wood stringer (as shown as $G_2$ in the second embodiment of the first mount assembly, FIGS. 4B-4H); a conventional 3×3 metal stringer ((as shown as $G_3$ in the first embodiment of the first mount assembly, FIGS. 5C-5H).

In one exemplary aspect, and not meant to be limiting, the gap G can be between about 0.1 to about 4.0 inches; preferably between about 0.15 to about 3.5 inches; and more preferably between about 0.25 to about 3.0 inches. In a preferred embodiment, $G_1$ can be between about 0.1 to about 1.0 inches; preferably between about 0.15 to about 0.5 inches; more preferably between about 0.25 to about 0.3 inches; and still more preferred about 0.292 inches. In another preferred embodiment, $G_2$ can be between about 1.0 to about 2.0 inches; preferably between about 1.2 to about 1.8 inches; more preferably between about 0.4 to about 0.55 inches; and still more preferred about 1.48 inches. In yet another preferred embodiment, $G_3$ can be between about 2.5 to about 4.0 inches; preferably between about 2.75 to about 3.5 inches; more preferably between about 2.9 to about 3.0 inches; and still more preferred about 2.98 inches.

The second leg of the frame mount defines an opening 83 configured for receipt of an appropriately sized fastener, such as, for example and without limitation, a bolt, screw, nail, brad and the like, such that the second leg can be fixed relative to the stringer after insertion of the stringer therethrough the gap and into contact with the first leg of the frame mount.

Referring to FIG. 9 the billboard mounts system can further include a back member 60 that is configured to be selectively coupled to the base mount of the first mount assembly of the panel such that respective portions of a side strut can be selectively fixedly positioned between the back member and the base mount. In this aspect, the inwardly projecting portion 45 of each strut flange 44 defines the first mount surface 46 suitable for engagement of a bottom surface of the base mount and the second mount surface 45 suitable for engagement of a back member 60. The back member 60 defines at least one opening 61 extending therethrough the base mount that is sized and configured to receive a fastener, such as, for example a conventional screw/nut combination.

In operation, the base member is inserted in the longitudinally extending channel of a respective side strut and is positioned is a desired position. The first mounting assembly is positioned on the first mount surface 46 of the side strut such that the openings of the back member 60 and the base mount are positioned in co-axial relationship. In the desired position, positioning bolts/nuts can be selectively mounted therein the openings of the back member 60 and the base mount such that edge portions of base member are brought into contact with the second mount surface of the side strut and portions of the bottom surface of the base mount are brought into contact with the first mount surface—this allowing the first mount assembly to be selectively positioned at a desired location along the side strut of the panel. One will appreciate that being able to selectively position respective first mount assemblies on the respective elongate channels of the side struts (that are positioned substantially vertical in operation) allows for the billboard mount system to be able to adapt and adjust to stringers of the billboard structure that are not oriented or spaced is a uniformed array of stringers.

As further shown, the billboard mount system can further include a second mount assembly 90 that is configured to be mounted to a first mount surface of a respective side strut. In operation, the second mount assemblies 90 are used on the two outermost panels forming the display surface and help to define the left and right edges of the display surface formed by the plurality of panels.

In this aspect, the second mount assembly 90 includes a substantially planar base member 92 that defies at least one first opening 94 extending through the base member proximate the proximal edge 96 of the base member 92 and at least one second opening 97 extending though the base member 92 proximate the distal edge 98 of the base member.

In operation, the base member 92 is inserted in the longitudinally extending channel 48 of the outermost side strut of the respective panels and is positioned in a desired position. The second mounting assembly 90 is positioned on the first mount surface of the side strut such that the at least one opening of the back member 60 and the at least one second opening 97 that extends though the base member 92 proximate the distal edge of the base member are positioned in co-axial relationship.

In the desired position, positioning bolts/nuts can be selectively mounted therein the at least one opening of the back member 60 and the at least one second opening 97 extending though the base member 92 such that edge portions of the base member 92 are brought into contact with the second mount surface 45 of the side strut and portions of the bottom surface of the base member 92 are brought into contact with the first mount surface 46—this operation allowing the second mount assembly to be selectively positioned at a desired location along the outermost side struts of the panels. As shown, when mounted, the at least one first opening extending through the base member is positioned inwardly such that the proximal edge of the base member is spaced inwardly away from the outermost side strut.

In this aspect, a selected first mounting assembly 70 is connected to the second mounting assembly 90 by bolts/nuts, fasteners and the like that can be selectively mounted therein the at least one opening of the base mount of the first mounting assembly and the at least one second opening 94 extending though the base member 92. One will appreciate that being able to selectively position respective second mount assemblies on the respective elongate channels of the outermost side struts of the panels (that are positioned substantially vertical in operation) allows for the billboard mount system to be able to adapt and adjust to stringers of the billboard structure that are not oriented or spaced is a uniformed array of stringers.

Figure 10A:
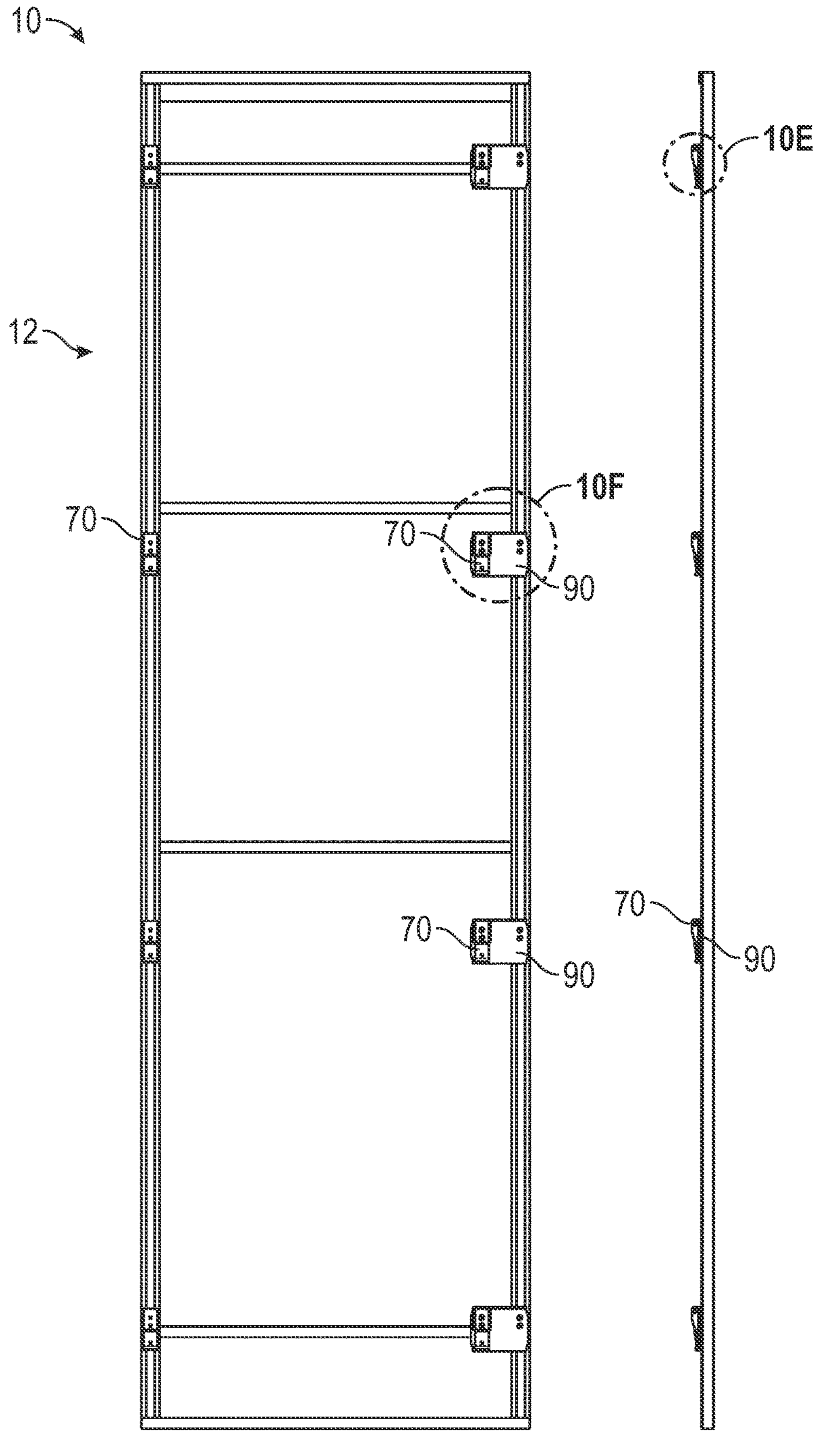
FIG. 10A schematically illustrates a perspective view of a panel of the billboard mount system showing the frame assembly and a plurality of first mount assemblies and a plurality of second mount assemblies mounted to a side strut of the frame assembly, which defines respective edges of the display surface formed by the plurality of panels.
Figure 10B:
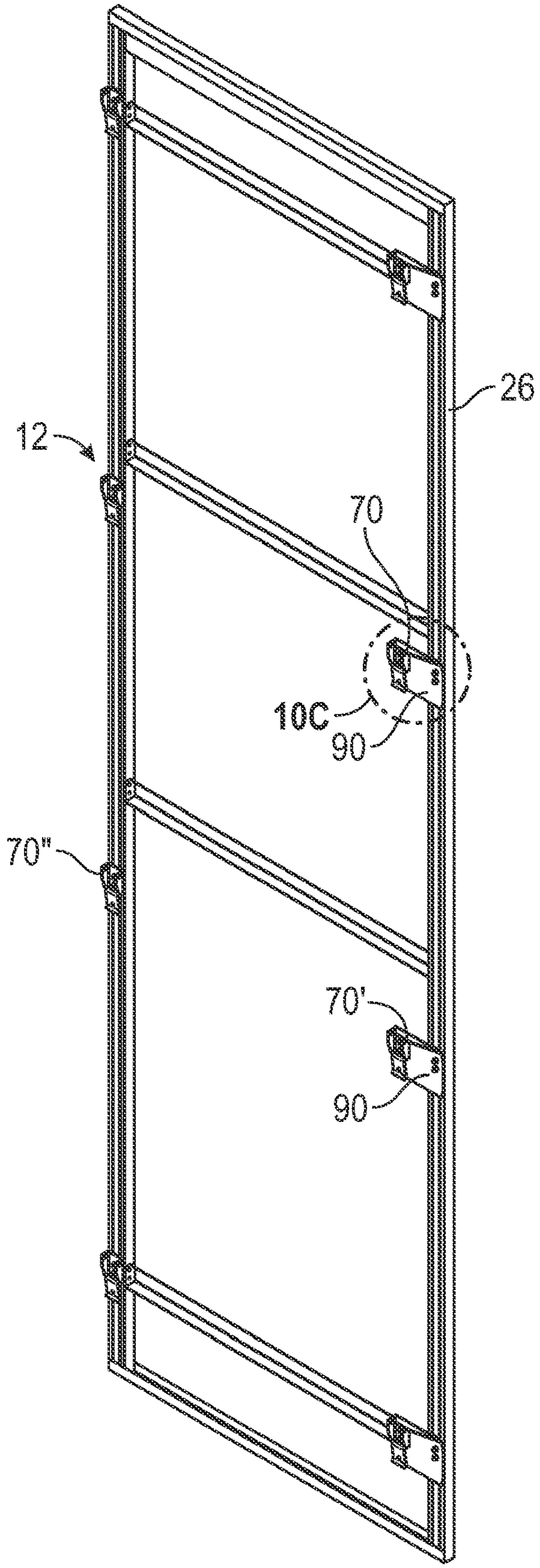
FIG. 10B schematically illustrates an enlarged elevational view of the second mount assembly connected to a respective side strut and showing a first mount assembly connected to a proximal portion of the second mount assembly.
Figure 10C:
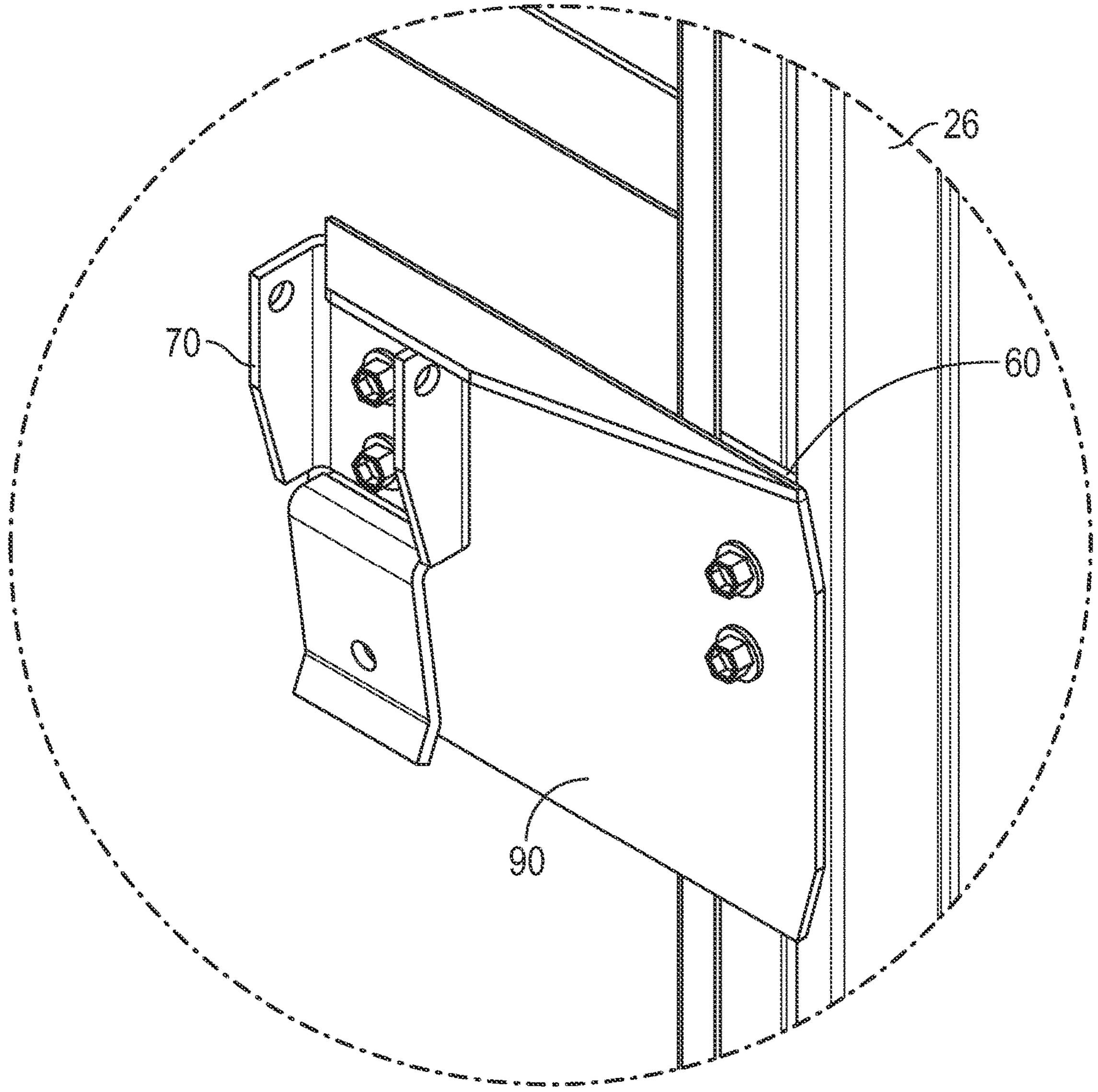
FIG. 10C schematically illustrates a top elevational view of a panel of the billboard mount system showing the frame assembly and a plurality of first mount assemblies mounted to side struts of the frame assembly.
Figure 10D:
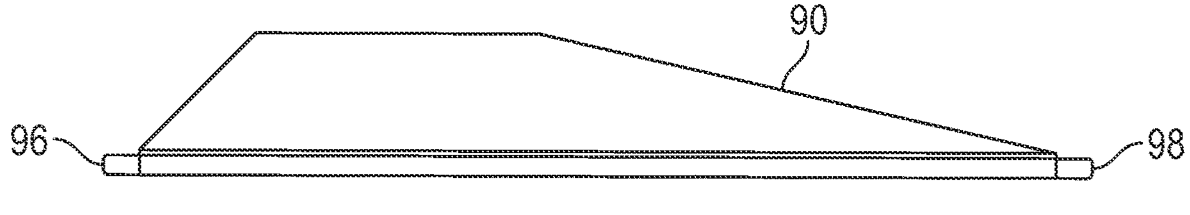
FIG. 10D schematically illustrates a top elevational view of a second mount assembly.

Referring to FIGS. 10A-10F, an exemplary panel of the billboard mount system is schematically illustrated. In FIG. 10A, the panel shows the frame assembly and a plurality of first mount assemblies and a plurality of second mount assemblies being mounted to a side strut of the frame assembly, which defines respective edges of the display surface formed by the plurality of panels. FIG. 10B shows an enlarged elevational view of the second mount assembly being connected to a respective side strut and further shows a first mount assembly being connected to a proximal portion of the second mount assembly. FIG. 10C shows the frame assembly and a plurality of first mount assemblies being mounted to side struts of the frame assemble while FIG. 10D shows the second mount assembly.

Figure 10E:
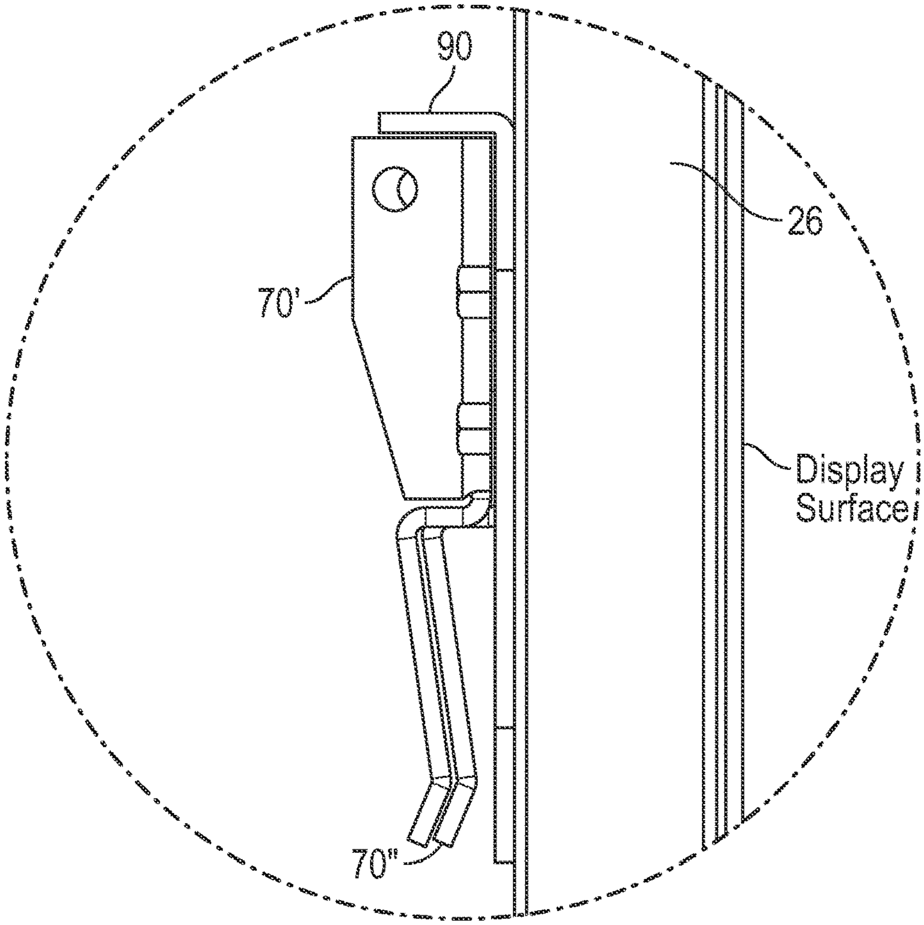
FIG. 10E schematically illustrates an enlarged, partial side elevational view of a second mount assembly mounted to a mount surface of a respective side strut and showing a first mount assembly mounted to a face surface of the second mount assembly.
Figure 10F:
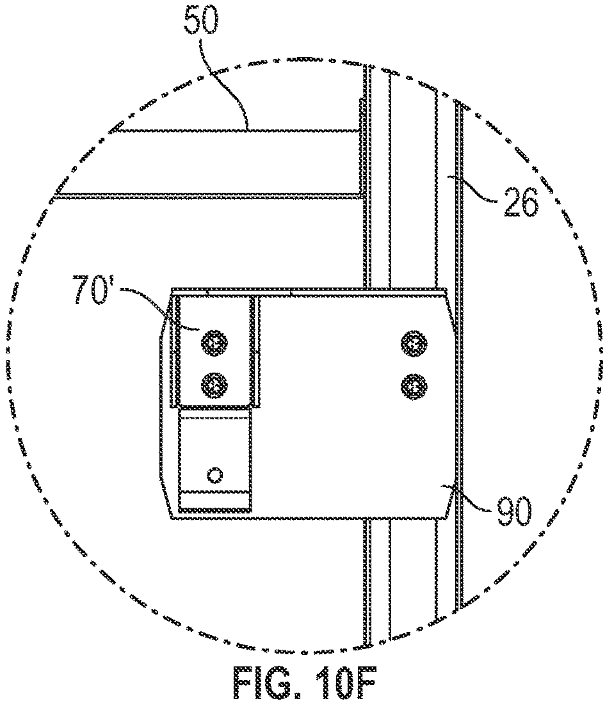
FIG. 10F schematically illustrates an enlarged, partial elevational view of a second mount assembly mounted to a first mount surface of a respective side strut and showing a first mount assembly mounted to a face surface of the second mount assembly.
Figure 10G:
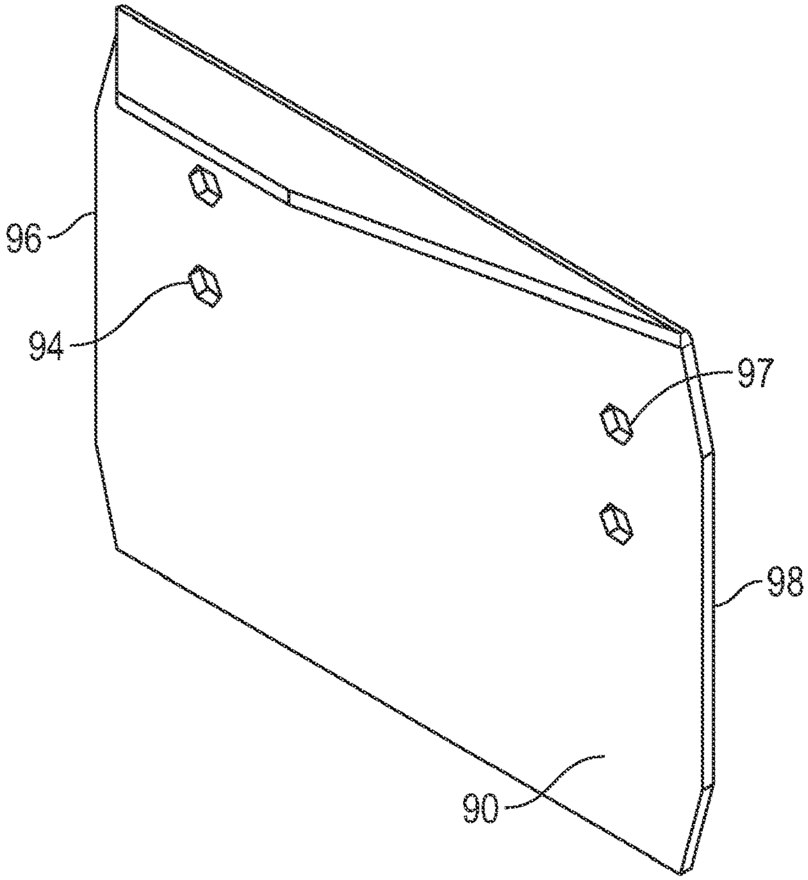
FIG. 10G schematically illustrates a perspective view of a second mount assembly.
Figure 10H:
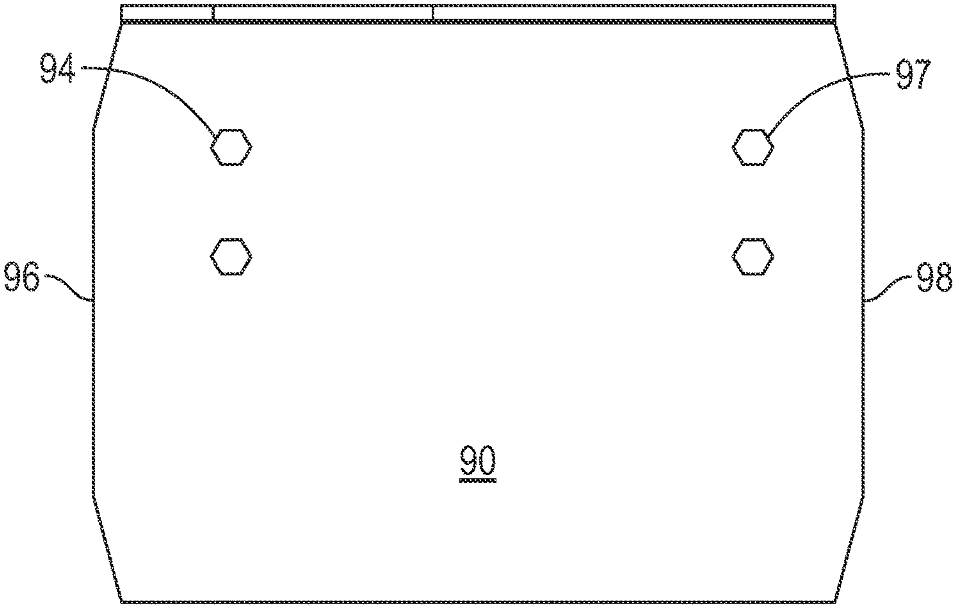
FIG. 10H schematically illustrates a side elevational view of a second mount assembly.

Similarly, FIG. 10E shows a second mount assembly being mounted to a mount surface of a respective side strut and a first mount assembly being mounted to a face surface of the second mount assembly. In a further exemplary aspect shown in FIG. 10F, a second mount assembly can be mounted to a first mount surface of a respective side strut and a first mount assembly can be mounted to a face surface of the second mount assembly.

Figure 11:
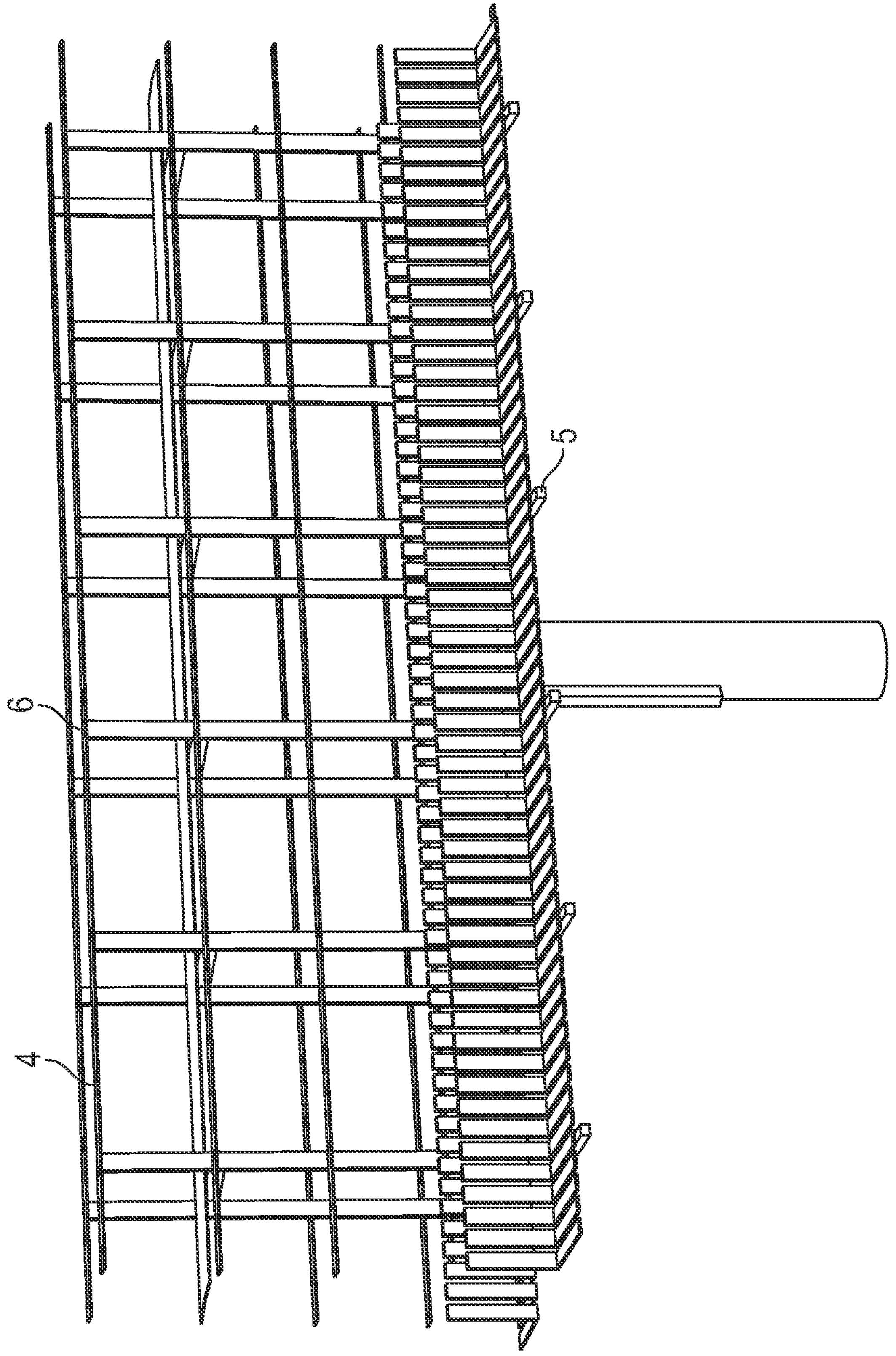
FIG. 11 schematically illustrates a perspective view of the plurality of stringers of a billboard structure.

Referring to FIG. 11, a perspective illustration of an exemplary, and non-limiting, conventional billboard structure is shown where one or more stringers 4 can be attached to billboard structural uprights 6. Generally, uprights are poles or metal I-beams that are positioned in a substantially vertical orientation; however, other or additional materials can be used. In use, stringers 4 have a width to be accepted in the gap formed by the first mount assemblies.

The material of stringer 4 can be metal, such as angled metal. However, other or alternative materials can be used. It will be appreciated that the dimensions of the stringer can be conventional, but it is contemplated that, for a given load, metal stringers can have smaller dimensions than wooden stringers.

In embodiments described herein, a billboard mount system mountable to a plurality of fixedly positioned stringers of an existing billboard structure can include a plurality of panels that are configured to be selectively mountable to the plurality of fixedly positioned stringers to form a billboard display surface that is positioned in a display plane that is oriented at a desired angle relative to the horizontal. In one embodiment, each panel can include a frame assembly and a plurality of first mount assemblies configured to be mounted to selected portions of the plurality of fixedly positioned stringers. In this aspect, the frame assembly can have an upper strut and an opposed and parallel lower strut that are connected to respective opposed and parallel side struts to form a panel frame positionable in the display plane. In a further aspect, each first mount assemblies can be configured to be fixedly mounted to a selected portion of an underlying stringer of the plurality of fixedly positioned stringers and configured to be fixedly mounted to a select portion of a side strut of the frame assembly.

In embodiments, the frame assembly can further include at least one intermediate strut that is connected to the opposed and parallel side struts. In this embodiment, each intermediate strut is positioned between and spaced from the upper and opposed lower struts and is positioned substantially parallel to the respective upper and lower struts.

In embodiments shown, each first mount assembly includes a substantially planar base mount having a distal edge and a pair of opposing side edges. In this embodiment, the base mount defines at least one opening extending therethrough the base mount that is sized and configured to receive a fastener. In other embodiments, the base mount can further include first and second legs that are connected to the side edges of the base mount and are positioned in parallel planes that are transverse to the base mount. In an aspect, each of the first and second legs can define openings that extend through the width of the respective legs along a co-axial axis.

In embodiments, for respective panels that are positioned in an adjoining relationship, first and second legs of adjoining first mount assemblies are positioned in an adjoining relationship such that the respective openings in the respective first and second legs of panels of the adjoining first mount assemblies are positioned in co-axial relationship and are sized and configured to receive a fastener to allow adjoining panel members of the plurality of panel members to be fixed relative to each other.

In embodiments, each first mount assembly can further include a frame mount that has a first leg that is connected to the distal edge of the base mount and is positioned in a plane transverse to the base mount and a second leg that is connected to a distal end of the first leg and that extends downwardly and away toward a plane in which the base mount is positioned. In this aspect, the second leg can be positioned at an acute angle β with respect to the first leg. In embodiments, the frame mount can further include a third leg that is connected to a distal end of the second leg and extends outwardly and away from the plane in which the base mount is positioned. In this aspect, the third leg can be positioned at an obtuse angle α with respect to the second leg.

In embodiments, the second leg and the first leg and the plane in which the base mount is positioned defines a gap that is sized to receive a selected portion of an underlying stringer of the plurality of fixedly positioned stringers. In this aspect, the second leg of the frame mount can define an opening configured for receipt of a fastener such that the second leg of a respective frame mount can be mounted to the underlying stringer after insertion of the stringer therethrough the gap and into contact with the first leg of the frame mount.

In embodiments, each upper and lower strut can include a top strut portion having longitudinally extending edges and first and second strut legs that are connected to the longitudinally extending edges of the top strut portion and are positioned in parallel planes that are transverse to the top strut portion. In this aspect, the top strut and the first and second strut legs can define a longitudinally extending channel having a first width dimension in cross-section that is greater than the depth dimension of the side strut.

In other embodiments, each side strut can include a lower strut portion having longitudinally extending edges and first and second strut legs that are connected to the longitudinally extending edges of the lower strut portion and are positioned in parallel planes that are transverse to the top strut portion. In this aspect, each side strut can further include first and second strut flanges that are connected to respective longitudinally extending edges of the respective first and second strut legs. In a further contemplated aspect, each strut flange can define a first mount surface suitable for engagement of a bottom surface of a base mount of a first mount assembly and an opposed, second mount surface suitable for engagement of a back member.

In embodiments, the lower strut portion and the first and second strut legs can define a longitudinally extending channel having a second width dimension in cross-section that is less than the width of the back member. In a further aspect and as one skilled in the art will appreciate, a third width dimension between the opposing inwardly projecting first and second strut flanges is greater than the width of the back member.

In embodiments, the billboard mount system can further include a plurality of second mount assemblies. In aspects, each second mount assembly can be configured to be mounted to a first mount surface of a respective side strut of two outermost panels of the billboard display surface formed by the plurality of panels. In embodiments, each second mount assembly can include a substantially planar base member that defies at least one first opening extending through the base member proximate a proximal edge of the base member and at least one second opening extending though the base member proximate a distal edge of the base member.

In operational embodiments, the base member of the second mount assembly can be configured to insertable in the longitudinally extending channel of the outermost side strut of the respective plurality of panels and is positioned on the first mount surface of the side strut such that the at least one opening of a respective back member and the at least one second opening of the respective second mount assembly positioned in co-axial relationship. In this aspect, the at least one opening of the respective back member and the at least one second opening of the respective second mount assembly are sized and configured to receive a fastener such that edge portions of the base member of the second mount assembly contact the second mount surface of the side strut and portions of the bottom surface of the base member are brought into contact with the first mount surface to selectively position the second mount assembly at a desired location along the outermost side struts of the plurality of panels.

The foregoing description generally illustrates and describes various embodiments of the present disclosure. It will, however, be understood by those skilled in the art that various changes and modifications can be made to the above-discussed construction of without departing from the spirit and scope thereof as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments, and numerous variations, modifications, and additions further can be made thereto without departing from the spirit and scope of the present invention as set forth in the appended claims.

What is claimed is:

1. A billboard mount system mountable to a plurality of fixedly positioned stringers of an existing billboard structure, comprising:

a plurality of panels configured to be selectively mountable to the plurality of fixedly positioned stringers to form a billboard display surface that is positioned in a display plane that is oriented at a desired angle relative to the horizontal, each panel comprising:

a frame assembly having an upper strut and an opposed and parallel lower strut that are connected to respective opposed and parallel side struts to form a panel frame positionable in the display plane; and a plurality of first mount assemblies configured to be mounted to selected portions of the plurality of fixedly positioned stringers, each first mount assembly configured to be fixedly mounted to a selected portion of an underlying stringer of the plurality of fixedly positioned stringers and configured to be fixedly mounted to a select portion of a side strut of the frame assembly, wherein each first mount assembly comprises a base mount, wherein the base mount is substantially planar and has a distal edge and a pair of opposing side edges, wherein the base mount defines at least one opening extending therethrough the base mount that is sized and configured to receive a fastener, wherein the base mount further comprises first and second legs that are connected to the side edges of the base mount and are positioned in parallel planes that are transverse to the base mount, and wherein each of the first and second legs define openings that extend through the width of the respective legs along a co-axial axis.

2. The billboard mount system of claim 1, wherein, for respective panels that are positioned in an adjoining relationship, first and second legs of adjoining first mount assemblies are positioned in an adjoining relationship such that the respective openings in the respective first and second legs of panels of the adjoining first mount assemblies are positioned in co-axial relationship and are sized and configured to receive a fastener to allow adjoining panel members of the plurality of panel members to be fixed relative to each other.

3. The billboard mount system of claim 1, wherein each first mount assembly further comprises a frame mount that has a first leg that is connected to the distal edge of the base mount and is positioned in a plane transverse to the base mount and a second leg that is connected to a distal end of the first leg and that extends downwardly and away toward a plane in which the base mount is positioned, and wherein the second leg is positioned at an acute angle β with respect to the first leg.

4. The billboard mount system of claim 3, wherein the acute angle β is between about 70 to 87 degrees.

5. The billboard mount system of claim 3, wherein the frame mount further comprises a third leg that is connected to a distal end of the second leg and extends outwardly and away from the plane in which the base mount is positioned, and wherein the third leg is positioned at an obtuse angle α with respect to the second leg.

6. The billboard mount system of claim 5, wherein the obtuse angle α is between about 130 to 170 degrees.

7. The billboard mount system of claim 3, wherein the second leg and the first leg and the plane in which the base mount is positioned defines a gap that is sized to receive a selected portion of an underlying stringer of the plurality of fixedly positioned stringers.

8. The billboard mount system of claim 7, wherein the gap is between about 0.1 to about 4.0 inches.

9. The billboard mount system of claim 7, wherein the gap is between about 2.5 to about 4.0 inches.

10. The billboard mount system of claim 7, wherein the second leg of the frame mount defines an opening configured for receipt of a fastener such that the second leg of a respective frame mount can be mounted to the underlying stringer after insertion of the stringer therethrough the gap and into contact with the first leg of the frame mount.

11. The billboard mount system of claim 3, wherein each upper and lower strut comprises a top strut portion having longitudinally extending edges and first and second strut legs that are connected to the longitudinally extending edges of the top strut portion and are positioned in parallel planes that are transverse to the top strut portion.

12. The billboard mount system of claim 11, wherein the top strut and the first and second strut legs define a longitudinally extending channel having a first width dimension in cross-section that is greater than the depth dimension of the side strut.

13. The billboard mount system of claim 12, wherein each side strut comprises a lower strut portion having longitudinally extending edges and first and second strut legs that are connected to the longitudinally extending edges of the lower strut portion and are positioned in parallel planes that are transverse to the top strut portion.

14. The billboard mount system of claim 13, wherein each side strut further comprises first and second strut flanges that are connected to respective longitudinally extending edges of the respective first and second strut legs.

15. The billboard mount system of claim 14, wherein each strut flange defines a first mount surface suitable for engagement of a bottom surface of a base mount of a first mount assembly and an opposed, second mount surface suitable for engagement of a back member.

16. The billboard mount system of claim 14, wherein the lower strut portion and the first and second strut legs define a longitudinally extending channel having a second width dimension in cross-section that is less than the width of the back member, and wherein a third width dimension between the opposing inwardly projecting first and second strut flanges is greater than the width of the back member.

17. The billboard mount system of claim 15, further comprising a plurality of second mount assemblies, each second mount assembly being configured to be mounted to a first mount surface of a respective side strut of two outermost panels of the billboard display surface formed by the plurality of panels.

18. The billboard mount system of claim 17, wherein each second mount assembly comprise a substantially planar base member that defies at least one first opening extending through the base member proximate a proximal edge of the base member and at least one second opening extending though the base member proximate a distal edge of the base member.

19. The billboard mount system of claim 18, wherein the base member of the second mount assembly is configured to insertable in the longitudinally extending channel of the outermost side strut of the respective plurality of panels and is positioned on the first mount surface of the side strut such that the at least one opening of a respective back member and the at least one second opening of the respective second mount assembly positioned in co-axial relationship and are sized and configured to receive a fastener such that edge portions of the base member of the second mount assembly contact the second mount surface of the side strut and portions of the bottom surface of the base member are brought into contact with the first mount surface to selectively position the second mount assembly at a desired location along the outermost side struts of the plurality of panels.

20. The billboard mount system of claim 3, wherein the frame assembly further comprises at least one intermediate strut that is connected to the opposed and parallel side struts, and wherein each intermediate strut is positioned between and spaced from the upper and opposed lower struts and is positioned substantially parallel to the respective upper and lower struts.

21. A billboard mount system mountable to a plurality of fixedly positioned stringers of an existing billboard structure, comprising:

- a plurality of panels configured to be selectively mountable to the plurality of fixedly positioned stringers to form a billboard display surface that is positioned in a display plane that is oriented at a desired angle relative to the horizontal, each panel comprising:
- a frame assembly having an upper strut and an opposed and parallel lower strut that are connected to respective opposed and parallel side struts to form a panel frame positionable in the display plane; and
- a plurality of first mount assemblies configured to be mounted to selected portions of the plurality of fixedly positioned stringers, each first mount assembly configured to be fixedly mounted to a selected portion of an underlying stringer of the plurality of fixedly positioned stringers and configured to be fixedly mounted to a select portion of a side strut of the frame assembly, wherein each first mount assembly comprises:
  - a base mount, wherein the base mount is substantially planar and has a distal edge and a pair of opposing side edges, wherein the base mount defines at least one opening extending therethrough the base mount that is sized and configured to receive a fastener, wherein the base mount further comprises first and second legs that are connected to the side edges of the base mount and are positioned in parallel planes that are transverse to the base mount, and wherein each of the first and second legs define openings that extend through the width of the respective legs along a co-axial axis,
  - a frame mount that has a first leg that is connected to the distal edge of the base mount and is positioned in a plane transverse to the base mount and a second leg that is connected to a distal end of the first leg and that extends downwardly and away toward a plane in which the base mount is positioned, wherein the second leg is positioned at an acute angle β with respect to the first leg, and wherein the second leg and the first leg and the plane in which the base mount is positioned defines a gap that is sized to receive a selected portion of an underlying stringer of the plurality of fixedly positioned stringers.

22. The billboard mount system of claim 21, wherein the second leg of the frame mount defines an opening configured for receipt of a fastener such that the second leg of a respective frame mount can be mounted to the underlying stringer after insertion of the stringer therethrough the gap and into contact with the first leg of the frame mount.

23. The billboard mount system of claim 21, wherein each upper and lower strut comprises a top strut portion having longitudinally extending edges and first and second strut legs that are connected to the longitudinally extending edges of the top strut portion and are positioned in parallel planes that are transverse to the top strut portion, and wherein the top strut and the first and second strut legs define a longitudinally extending channel having a first width dimension in cross-section that is greater than the depth dimension of the side strut.

24. The billboard mount system of claim 21, wherein each side strut comprises a lower strut portion having longitudinally extending edges and first and second strut legs that are connected to the longitudinally extending edges of the lower strut portion and are positioned in parallel planes that are transverse to the top strut portion, wherein each side strut further comprises first and second strut flanges that are connected to respective longitudinally extending edges of the respective first and second strut legs, and wherein each strut flange defines a first mount surface suitable for engagement of a bottom surface of a base mount of a first mount assembly and an opposed, second mount surface suitable for engagement of a back member.

25. The billboard mount system of claim 24, further comprising a plurality of second mount assemblies, each second mount assembly being configured to be mounted to a first mount surface of a respective side strut of two outermost panels of the billboard display surface formed by the plurality of panels, and wherein each second mount assembly comprise a substantially planar base member that defies at least one first opening extending through the base member proximate a proximal edge of the base member and at least one second opening extending though the base member proximate a distal edge of the base member.

26. The billboard mount system of claim 21, wherein the base member of the second mount assembly is configured to insertable in the longitudinally extending channel of the outermost side strut of the respective plurality of panels and is positioned on the first mount surface of the side strut such that the at least one opening of a respective back member and the at least one second opening of the respective second mount assembly positioned in co-axial relationship and are sized and configured to receive a fastener such that edge portions of the base member of the second mount assembly contact the second mount surface of the side strut and portions of the bottom surface of the base member are brought into contact with the first mount surface to selectively position the second mount assembly at a desired location along the outermost side struts of the plurality of panels.

27. The billboard mount system of claim 21, wherein, for respective panels that are positioned in an adjoining relationship, first and second legs of adjoining first mount assemblies are positioned in an adjoining relationship such that the respective openings in the respective first and second legs of panels of the adjoining first mount assemblies are positioned in co-axial relationship and are sized and configured to receive a fastener to allow adjoining panel members of the plurality of panel members to be fixed relative to each other.

* * * * *